US007887410B2

(12) United States Patent
Okada

(10) Patent No.: US 7,887,410 B2
(45) Date of Patent: Feb. 15, 2011

(54) GAMING MACHINE

(75) Inventor: Kazuo Okada, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 977 days.

(21) Appl. No.: 11/734,982

(22) Filed: Apr. 13, 2007

(65) Prior Publication Data

US 2008/0058050 A1 Mar. 6, 2008

Related U.S. Application Data

(63) Continuation-in-part of application No. 10/268,725, filed on Oct. 11, 2002, now abandoned, and a continuation-in-part of application No. 10/263,820, filed on Oct. 4, 2002, now abandoned, and a continuation-in-part of application No. 10/261,769, filed on Oct. 2, 2002, now Pat. No. 7,465,232, and a continuation-in-part of application No. 10/262,106, filed on Oct. 2, 2002, now abandoned.

(30) Foreign Application Priority Data

| | | |
|---|---|---|
| Oct. 2, 2001 | (JP) | ............................ 2001-306773 |
| Oct. 2, 2001 | (JP) | ............................ 2001-306774 |
| Oct. 5, 2001 | (JP) | ............................ 2001-309825 |
| Oct. 12, 2001 | (JP) | ............................ 2001-315488 |
| Mar. 20, 2007 | (JP) | ............................ 2007-073361 |

(51) Int. Cl.
*A63F 9/24* (2006.01)
*A63F 13/00* (2006.01)

(52) U.S. Cl. ............................ 463/20; 463/16; 463/25; 463/29; 463/42; 273/138.1; 273/138.2; 273/143 R

(58) Field of Classification Search .................. 463/16, 463/20, 25, 29, 42; 273/138.1–2, 143 R
See application file for complete search history.

(56) References Cited

U.S. PATENT DOCUMENTS 4,283,709 A 8/1981 Lucero et al.

(Continued)

FOREIGN PATENT DOCUMENTS

DE 32 42 890 A1 5/1984

(Continued)

OTHER PUBLICATIONS

"Pachi-Slot Daizukan 2001", Byakuya-Shobo Co., Ltd., May 12, 2001, pp. 22, 24 and 36 with two cover pages.

(Continued)

*Primary Examiner*—John M Hotaling, II
*Assistant Examiner*—Ryan Hsu
(74) *Attorney, Agent, or Firm*—Oblon, Spivak, McClelland, Maier & Neustadt, L.L.P.

(57) ABSTRACT

When a predetermined amount of credits have been inserted into a slot machine, the game mode is switched from the non-insurance mode to the insurance mode according to the player's input operation via a touch panel. In the insurance mode, determination is made whether or not the amount of bet credits matches the maximum bet amount. When determination has been made that the amount of bet credits matches the maximum bet amount, the number of games is counted after switching of the game mode to the insurance mode. When the counted number of games reaches a predetermined number, a predetermined amount of credits is paid out. Furthermore, in this case, only in a case where determination has been made that the amount of credits bet on the game matches the maximum bet amount, the difference between the counted number of games and the predetermined number is displayed.

5 Claims, 25 Drawing Sheets

U.S. PATENT DOCUMENTS 4,624,459 A 11/1986 Kaufman
4,652,998 A 3/1987 Koza et al.
4,669,731 A 6/1987 Clarke
4,775,937 A 10/1988 Bell
4,837,728 A 6/1989 Barrie et al.
4,964,638 A 10/1990 Ishida
5,178,390 A 1/1993 Okada
5,229,764 A 7/1993 Matchett et al.
5,280,909 A 1/1994 Tracy
5,429,361 A 7/1995 Raven et al.
5,564,700 A 10/1996 Celona
5,611,730 A 3/1997 Weiss
5,639,088 A 6/1997 Schneider et al.
5,655,961 A 8/1997 Acres et al.
5,674,128 A 10/1997 Holch et al.
5,695,402 A 12/1997 Stupak
5,702,303 A 12/1997 Takemoto et al.
5,768,382 A 6/1998 Schneier et al.
5,770,533 A 6/1998 Franchi
5,810,665 A 9/1998 Takemoto et al.
5,820,459 A 10/1998 Acres et al.
5,836,817 A 11/1998 Acres et al.
5,836,819 A * 11/1998 Ugawa ........................ 463/30
5,890,963 A 4/1999 Yen
5,910,048 A 6/1999 Feinberg
6,001,016 A 12/1999 Walker et al.
6,003,013 A 12/1999 Boushy et al.
6,089,980 A 7/2000 Gauselmann
6,113,493 A * 9/2000 Walker et al. ................. 463/25
6,196,547 B1 3/2001 Pascal et al.
6,224,482 B1 5/2001 Bennett
6,234,896 B1 5/2001 Walker et al.
6,241,608 B1 6/2001 Torango
6,244,957 B1 6/2001 Walker et al.
6,254,483 B1 7/2001 Acres
6,257,981 B1 7/2001 Acres et al.
6,270,409 B1 8/2001 Shuster
6,273,820 B1 8/2001 Haste, III
6,312,333 B1 11/2001 Acres
6,319,125 B1 11/2001 Acres
6,409,602 B1 6/2002 Wiltshire et al.
6,439,995 B1 8/2002 Hughs-Baird et al.
6,517,433 B2 2/2003 Loose et al.
6,575,832 B1 6/2003 Manfredi et al.
6,626,758 B1 9/2003 Parham et al.
6,645,078 B1 11/2003 Mattice
6,695,697 B1 2/2004 Okada
6,854,729 B2 * 2/2005 Yamaguchi ............. 273/121 B
6,857,958 B2 2/2005 Osawa
6,932,704 B2 8/2005 Walker et al.
6,932,707 B2 8/2005 Duhamel
6,984,173 B1 1/2006 Piechowiak et al.
2002/0198039 A1 12/2002 Marks et al.
2003/0013516 A1 1/2003 Walker et al.
2003/0064809 A1 4/2003 Okada
2003/0064810 A1 4/2003 Okada
2003/0069067 A1 4/2003 Okada
2003/0069073 A1 4/2003 Okada
2003/0073486 A1 4/2003 Okada
2003/0073487 A1 4/2003 Okada
2003/0078095 A1 4/2003 Okada
2003/0119585 A1 6/2003 Walker et al.
2003/0220138 A1 11/2003 Walker et al.
2004/0048646 A1 3/2004 Visocnik
2004/0209681 A1 * 10/2004 Emori et al. .................. 463/31
2005/0059480 A1 3/2005 Soukup et al.
2006/0009276 A1 1/2006 Okada
2007/0060250 A1 3/2007 Okada et al.
2007/0060277 A1 3/2007 Okada
2007/0060278 A1 3/2007 Okada
2007/0060279 A1 3/2007 Okada et al.
2007/0060280 A1 3/2007 Okada
2007/0060281 A1 3/2007 Okada et al.
2007/0060282 A1 3/2007 Okada et al.
2007/0060283 A1 3/2007 Okada
2007/0060324 A1 3/2007 Okada
2007/0105609 A1 5/2007 Okada
2007/0105621 A1 5/2007 Okada
2007/0105622 A1 5/2007 Okada
2007/0149269 A1 6/2007 Benbrahim

FOREIGN PATENT DOCUMENTS

DE 37 12 841 A1 11/1988
DE 41 37 010 A1 8/1992
DE 100 49 444 A1 11/2001
EP 0 631 798 A1 1/1995
EP 0 840 264 A1 5/1998
EP 1 192 975 A1 4/2002
EP 1 302 914 A2 4/2003
EP 1 351 180 A2 10/2003
EP 1 477 947 A2 11/2004
EP 1 544 811 A2 6/2005
GB 2 326 830 A 1/1999
JP 61-118377 7/1986
JP 4-244178 9/1992
JP 6-79051 3/1994
JP 7-171262 7/1995
JP 7-299234 11/1995
JP 8-24401 1/1996
JP 8-29169 3/1996
JP 8-336657 12/1996
JP 9-94340 4/1997
JP 9-103576 4/1997
JP 9-264777 10/1997
JP 10-94666 4/1998
JP 10-118247 5/1998
JP 10-234945 9/1998
JP 11-19276 1/1999
JP 11-146938 6/1999
JP 11-253640 9/1999
JP 2000-342772 12/2000
JP 2001-204885 7/2001
JP 2001-259205 9/2001
JP 2001-269441 10/2001
JP 2003-47775 2/2003
JP 2003-47779 2/2003
JP 2003-53041 2/2003
JP 2003-53042 2/2003
JP 2003-71096 3/2003
JP 2003-71097 3/2003
JP 2003-71098 3/2003
JP 2003-111888 4/2003
JP 2003-111889 4/2003
JP 2003-111890 4/2003
JP 2003-111891 4/2003
JP 2003-111897 4/2003
JP 2003-117053 4/2003
JP 2003-117070 4/2003
JP 2003-117071 4/2003
JP 2003-117072 4/2003
JP 2003-117073 4/2003
JP 2003-126343 5/2003
JP 2003-205072 7/2003
WO WO 03/083795 A1 10/2003
WO WO 2004/095383 A1 11/2004

OTHER PUBLICATIONS

"Pachi-Slot Hisshogaido", Byakuya-Shobo Co., Ltd., 7th Volume, No. 14, Oct. 1, 1996, pp. 88-89 (with English Abstract).
U.S. Appl. No. 12/183,814, filed Jul. 31, 2008, Okada.
U.S. Appl. No. 12/183,721, filed Jul. 31, 2008, Okada.
U.S. Appl. No. 12/183,654, filed Jul. 31, 2008, Okada.
U.S. Appl. No. 12/183,804, filed Jul. 31, 2008, Okada.

U.S. Appl. No. 12/183,588, filed Jul. 31, 2008, Okada.
U.S. Appl. No. 12/183,720, filed Jul. 31, 2008, Okada.
"Trick Monster 2, Pachi-Slot Hisshogaido Max 2001, Oct. 2001" Byakuya-Shobo, Oct. 1, 2001, 4 pgs. (w/ English Abstract).
Office Action Issued Aug. 10, 2010, in Japanese Patent Application No. 2007-204699 Issued.

* cited by examiner

FIG. 2

| | LEFT REEL | CENTER REEL | RIGHT REEL |
|---|---|---|---|
| CODE NUMBER | SYMBOL | SYMBOL | SYMBOL |
| 00 | DO | DO | DO |
| 01 | PLUM | 2B | CHERRY |
| 02 | AB | APPLE | AB |
| 03 | PLUM | 2B | APPLE |
| 04 | AB | CHERRY | AB |
| 05 | PLUM | AB | PLUM |
| 06 | AB | PLUM | AB |
| 07 | PLUM | CHERRY | PLUM |
| 08 | 3B | 2B | AB |
| 09 | CHERRY | APPLE | PLUM |
| 10 | AB | 3B | AB |
| 11 | 2B | 1B | PLUM |
| 12 | AB | PLUM | 2B |
| 13 | 1B | 3B | 1B |
| 14 | 3B | 2B | 3B |
| 15 | AB | APPLE | 2B |
| 16 | APPLE | 2B | CHERRY |
| 17 | PLUM | 1B | PLUM |
| 18 | AB | PLUM | AB |
| 19 | PLUM | CHERRY | PLUM |
| 20 | 3B | 2B | AB |
| 21 | CHERRY | APPLE | PLUM |

| AWARD | | | OCCURRENCE PROBABILITY (%) | PAYOUT AMOUNT ※1 |
|---|---|---|---|---|
| BONUS GAME TRIGGER | | | 0.5 | ※2 |
| DO | DO | DO | 0.5 | 30 |
| 3B | 3B | 3B | 0.8 | 10 |
| 2B | 2B | 2B | 1.1 | 8 |
| CHERRY | CHERRY | CHERRY | 1.5 | 5 |
| 1B | 1B | 1B | 1.5 | 5 |
| PLUM | PLUM | PLUM | 1.8 | 4 |
| AB | AB | AB | 2.3 | 3 |
| CHERRY | CHERRY | (ANY) | 3 | 2 |
| CHERRY | (ANY) | (ANY) | 7.5 | 1 |

※1 NUMBER OF COINS PAID OUT PER COIN INSERTED

※2 FREE GAME IS EXECUTED PREDETERMINED NUMBER OF TIMES AS DETERMINED BY LOTTERY

FIG. 18

| CODE NUMBER | INDEX | STEPS(※) |
|---|---|---|
| 00 | 1 | 0 |
| 01 | | 18 |
| 02 | | 36 |
| 03 | | 54 |
| 04 | | 72 |
| 05 | | 91 |
| 06 | | 109 |
| 07 | | 127 |
| 08 | | 145 |
| 09 | | 163 |
| 10 | | 182 |
| 11 | 2 | 200 |
| 12 | | 218 |
| 13 | | 236 |
| 14 | | 254 |
| 15 | | 273 |
| 16 | | 291 |
| 17 | | 309 |
| 18 | | 327 |
| 19 | | 345 |
| 20 | | 364 |
| 21 | | 382 |

※ STEPS WITH INDEX 1 AS BASE (1)

(2)

| MAX BET | P |
|---|---|
| 3 | 180 |
| 15 | 800 |
| 30 | 1500 |
| 50 | 3000 |

GAMING MACHINE

This application is based on and claims the benefit of priority from Japanese Patent Application No. 2007-073361, filed on Mar. 20, 2007, the content of which is incorporated herein by reference.

BACKGROUND OF THE INVENTION

1. Field of the Invention

The present invention relates to a gaming machine that provides a game via a gaming medium (gaming value) such as coins or the like.

2. Related Art

Conventionally, amusement facilities having slot machines or the like (see Patent documents 1 through 44, for example) provide amusement services in which players play games via various kinds of gaming media such as coins, cash, or the like, which are inserted into the slot machines. With such amusement services, each slot machine provides a payout according to the award (game results) won by the player on his/her game.

Some casinos having multiple slot machines provide a known amusement service, that is, a so-called jackpot award, as follows. That is to say, a portion of the credits spent at these slot machines are reserved. When the reserved credits reach a predetermined value, some slot machines provide a great amount of payout, much greater than normal awards. In the normal state, each slot machine provides a normal award at a predetermined probability. Accordingly, each player plays a game to win the normal game. Furthermore, a jackpot award is provided at a predetermined time according to another award determination that differs from that of the normal award.

Patent document 1: U.S. Pat. No. 5,820,459

Patent document 2: U.S. Pat. No. 6,695,697

Patent document 3: U.S. Patent Application Publication No. 2003/0069073

Patent document 4: European Patent Application Publication No. 1192975

Patent document 5: U.S. Pat. No. 6,254,483

Patent document 6: U.S. Pat. No. 5,611,730

Patent document 7: U.S. Pat. No. 5,639,088

Patent document 8: U.S. Pat. No. 6,257,981

Patent document 9: U.S. Pat. No. 6,234,896

Patent document 10: U.S. Pat. No. 6,001,016

Patent document 11: U.S. Pat. No. 6,273,820

Patent document 12: U.S. Pat. No. 6,224,482

Patent document 13: U.S. Pat. No. 4,669,731

Patent document 14: U.S. Pat. No. 6,244,957

Patent document 15: U.S. Pat. No. 5,910,048

Patent document 16: U.S. Pat. No. 5,695,402

Patent document 17: U.S. Pat. No. 6,003,013

Patent document 18: U.S. Pat. No. 4,283,709

Patent document 19: European Patent Application Publication No. 0631798

Patent document 20: German Patent Application Publication No. 4137010

Patent document 21: British Patent Application Publication No. 2326830

Patent document 22: German Patent Application Publication No. 3712841

Patent document 23: U.S. Pat. No. 4,964,638

Patent document 24: U.S. Pat. No. 6,089,980

Patent document 25: U.S. Pat. No. 5,280,909

Patent document 26: U.S. Pat. No. 5,702,303

Patent document 27: U.S. Pat. No. 6,270,409

Patent document 28: U.S. Pat. No. 5,770,533

Patent document 29: U.S. Pat. No. 5,836,817

Patent document 30: U.S. Pat. No. 6,932,704

Patent document 31: U.S. Pat. No. 6,932,707

Patent document 32: U.S. Pat. No. 4,837,728

Patent document 33: European Patent Application Publication No. 1302914

Patent document 34: U.S. Pat. No. 4,624,459

Patent document 35: U.S. Pat. No. 5,564,700

Patent document 36: PCT International Publication No. WO 2003/083795

Patent document 37: German Patent Application Publication No. 3242890

Patent document 38: European Patent Application Publication No. 0840264

Patent document 39: German Patent Application Publication No. 10049444

Patent document 40: PCT International Publication No. WO 2004/095383

Patent document 41: European Patent Application Publication No. 1544811

Patent document 42: U.S. Pat. No. 5,890,963

Patent document 43: European Patent Application Publication No. 1477947

Patent document 44: European Patent Application Publication No. 1351180

However, conventional slot machines provide a jackpot award in which only the player who has been playing a game at the slot machine at which the jackpot award has been won can receive the benefit of the jackpot award. Such a jackpot award provides no benefit to other players having spent a great amount of coins. In some cases, a player receives the jackpot award immediately after he or she has started to play the game. In some cases, such a situation causes the other players to feel distrust or displeasure with respect to the amusement service, leading to a loss of interest in the amusement service.

In addition, conventional slot machines are known that provide a cashback service. With the cashback service, when the amount of credits thus spent by the player reaches a predetermined amount, the player can receive the cashback service (see Patent document 15, for example). That is, when the amount of credits thus spent by the player reaches a so-called upper limit, a predetermined amount of credits are paid out. However, with such slot machines, when the player has spent a great amount of credits, the player receives a profit according to the cashback service, even if the player has not won the game. In some cases, such a cashback service incurs a sense of unfairness among the players who have won profits according to the awards won in the games, leading to loss of interest in the amusement service.

The present invention has been made in view of the aforementioned problem. Accordingly, it is an object thereof to provide a slot machine that provides an amusement service without incurring a sense of unfairness with regard to players who can win in a game, thereby preventing a situation in which players who have spent a great amount of credits such as coins or the like feel distrust or displeasure with respect to the amusement service, or a situation in which such players lose interest in the amusement service.

SUMMARY OF THE INVENTION

In order to solve the aforementioned problem, the present invention provides the following features.

In a first aspect of the present invention, a slot machine is provided which comprises: a display that displays an image; a symbol display device that is capable of displaying a plurality of symbols; an input device that allows a player to input an instruction; and a controller programmed to execute the processes of: (a) executing a game by, after a predetermined amount of credits, which is not more than a maximum bet amount determined beforehand, has been bet, rearranging the multiple symbols via the symbol display device, and paying out a predetermined amount of credits according to the rearranged symbols; (b) determining whether the amount of bet credits is the maximum bet amount; (c) switching the game mode from a non-insurance mode to an insurance mode according to a player's input operation via the input device, when a predetermined amount of credits has been inserted; (d) counting the number of games after the game mode has been switched to the insurance mode, in a case where determination has been made in the determining process (b) that the amount of bet credits matches the maximum bet amount, and in a case where the switched game mode is the insurance mode; (e) executing a pay out of a predetermined amount of credits, when the counted number of games in the counting process (d) has reached a predetermined number; and (f) displaying the difference between the counted number of games and the predetermined number, only in a case where determination has been made in the determining process (b) that the amount of credits bet on the game matches the maximum bet amount.

With the slot machine according to the first aspect of the present invention, when a predetermined amount of credits has been inserted, the game mode is switched from the non-insurance mode to the insurance mode, according to the player's input operation via the input device. When the slot machine determines that the amount of bet credits matches the maximum bet amount, and the switched game mode is the insurance mode, it counts the number of games during the insurance mode. When the number of games thus counted reaches a predetermined number, a predetermined amount of credits are paid out. Furthermore, only when the slot machine determines that the amount of credits bet on the game matches the maximum bet amount, the slot machine displays the difference between the counted number of games and the predetermined number. That is, in a case that the player has inserted a predetermined amount of credits, and inputs a particular instruction via the input device, the game state of the slot machine is switched to the insurance mode. Then, when the number of games thus counted reaches a predetermined number, the player receives a predetermined award. When the number of games thus counted reaches a predetermined number, the player receives a predetermined award.

With such an arrangement, in the insurance mode, the number of games is counted, and when the number of games thus counted has reached a predetermined number, a predetermined amount of credits are paid out (the game mode is switched to the cashback mode), even if the player has spent a great amount of credits for games over a long period of time. Accordingly, the insurance mode provides an award to a player who has not won any award in the game. However, the player needs to insert a predetermined amount of credits before the game mode is switched to the insurance mode. In addition, when the slot machine determines that the amount of bet credits matches the maximum bet amount, it counts the number of games. Such an arrangement provides fairness among the players who can receive awards according to the games. Such an arrangement invites the players to play a game with the maximum permissible amount of credits, thereby providing the amusement facilities, such as casinos, with the increased earnings. In addition, the slot machine displays the difference between the number of games thus counted and the predetermined number, thereby preventing the players from losing interest in the game until the number of games reaches the predetermined number. Furthermore, since the slot machine continuously displays how soon a cashback mode is going to start, it can encourage a coming player to play a game.

Thus, such an arrangement provides an amusement service without incurring a sense of unfairness with regard to players who can win awards in the amusement service, thereby preventing a situation in which players who have spent a great amount of credits, such as coins, come to feel distrust or displeasure with respect to the amusement service, or a situation in which such players lose interest in the amusement service.

In a second aspect of the slot machine as described in the first aspect of the present invention, the controller is further programmed to execute the process (g): displaying an image indicating a mode selected from the insurance mode and the non-insurance mode on the display.

With the slot machine according to the second aspect of the present invention, the display displays an image which indicates that the current game mode is the non-insurance mode or the insurance mode. That is, the slot machine notifies the player of whether the current game state is the non-insurance mode or the insurance mode, thereby allowing the player to recognize the current game state. With such an arrangement, in cases where the player has spent a great amount of credits, such as coins or the like, the player plays the game in the non-insurance mode, giving consideration to an option to switch the game mode to the insurance mode. On the other hand, the insurance mode relaxes the player playing the game. Thus, such an arrangement prevents a situation in which players who have spent a great amount of credits, such as coins, come to feel distrust or displeasure with respect to the amusement service, or a situation in which such players lose interest in the amusement service.

In a third aspect of the slot machine as described in the first aspect of the present invention, in the displaying process (f), after the difference between the predetermined number and the counted number of games has reached a predetermined number, the difference is displayed, and a rendered image is displayed every time the number of games is counted.

With the slot machine according to the third aspect of the present invention, in a case where the number of remaining games, which is the difference between the predetermined number and the counted number of games, is a predetermined number or less, the slot machine displays the difference and provides visual effects every time that the number of remaining games is decremented, i.e., every time that the number of games is counted. Such an arrangement notifies the player who has spent a great amount of credits, such as coins or the like, that a predetermined amount of credits will be paid out soon, which relaxes the player playing the game. Thus, such an arrangement prevents a situation where players who have spent a great amount of credits, such as coins, come to feel distrust or displeasure with respect to the amusement service, or a situation in which such players lose the interest in the amusement service.

In a fourth aspect of the slot machine as described in the first aspect of the present invention, the symbol display device is a mechanical reel device including multiple reels, each of which has an outer face bearing the plurality of symbols. With such an arrangement, the display comprises a first display provided in front of the mechanical reel device, having a function of displaying a screen image while allowing a player to visually observe the multiple symbols displayed on the multiple reels, and a second display provided above the first display. Furthermore, in the displaying process (f), the first display displays the image indicating the difference between the counted number of games and the predetermined number, and the second display displays an image indicating that the current game state is the insurance mode.

With the slot machine according to the fourth aspect of the present invention, the symbol display device is a mechanical reel device on which multiple symbols are depicted. In addition, the display comprises a transparent first display that allows the player to visually identify the multiple symbols, and the second display provided above the first display. The first display displays an image that provides visual effects. On the other hand, the second display indicates whether the current game mode is the insurance mode or the non-insurance mode. Such an arrangement displays the game, the game state, and an image that provides visual effects, all at the same time, thereby allowing the player to recognize the game state. Thus, such an arrangement prevents a situation in which players who have spent a great amount of credits, such as coins, come to feel distrust or displeasure with respect to the amusement service, or a situation in which such players lose interest in the amusement service.

In a fifth aspect of the present invention, a method for a slot machine comprises the steps of: (a) executing a game by, after a predetermined amount of credits, which is not more than a maximum bet amount determined beforehand, has been bet, rearranging multiple symbols via a symbol display device that is capable of displaying the multiple symbols, and paying out a predetermined amount of credits according to the rearranged symbols; (b) determining whether the amount of bet credits is the maximum bet amount; (c) switching the game mode from a non-insurance mode to an insurance mode according to a player's input operation via an input device that allows the player to input an instruction, when a predetermined amount of credits has been inserted; (d) counting the number of games after the game mode has been switched to the insurance mode, in a case where determination has been made in the determining step (b) that the amount of bet credits matches the maximum bet amount, and in a case where the switched game mode is the insurance mode; (e) executing a pay out of a predetermined amount of credits, when the number of games counted in the counting step (d) has reached a predetermined number; and (f) displaying the difference between the number of counted games and the predetermined number, only in a case where determination has been made in the determining step (b) that the amount of credits bet on the game matches the maximum bet amount.

According to the fifth aspect of the present invention, in the insurance mode, the number of games is counted, and when the number of games thus counted reaches a predetermined number, a predetermined amount of credits are paid out (the game mode is switched to the cashback mode), even if the player has spent a great amount of credits in the games over a long period of time. Accordingly, the insurance mode provides an award to a player who has not won any award in the game. However, the player needs to insert a predetermined amount of credits before the game mode is switched to the insurance mode. Also, when the slot machine determines that the amount of bet credits matches the maximum bet amount, it counts the number of games during the insurance mode. Such an arrangement provides fairness among the players who can receive awards according to the games.

Such an arrangement invites the players to play a game with the maximum permissible amount of credits, thereby providing the amusement facilities, such as casinos, with the increased earnings. In addition, such an arrangement displays the difference between the number of games thus counted and the predetermined number, thereby preventing the players from losing interest in the game until the number of games reaches the predetermined number. Furthermore, since the slot machine continuously displays how soon a cashback mode is going to start, it encourages a coming player to play a game.

Thus, such an arrangement provides an amusement service without incurring a sense of unfairness with regard to players who can win awards in the amusement service, thereby preventing a situation in which players who have spent a great amount of credits, such as coins, come to feel distrust or displeasure with respect to the amusement service, or a situation in which such players lose interest in the amusement service.

BRIEF DESCRIPTION OF THE DRAWINGS

FIG. 2 is a schematic diagram illustrating symbol sequences, each of which is depicted on the outer face of a corresponding reel;

FIG. 18 is a schematic diagram illustrating the correspondence between the steps and the code number;

DETAILED DESCRIPTION OF THE INVENTION

Figure 1:
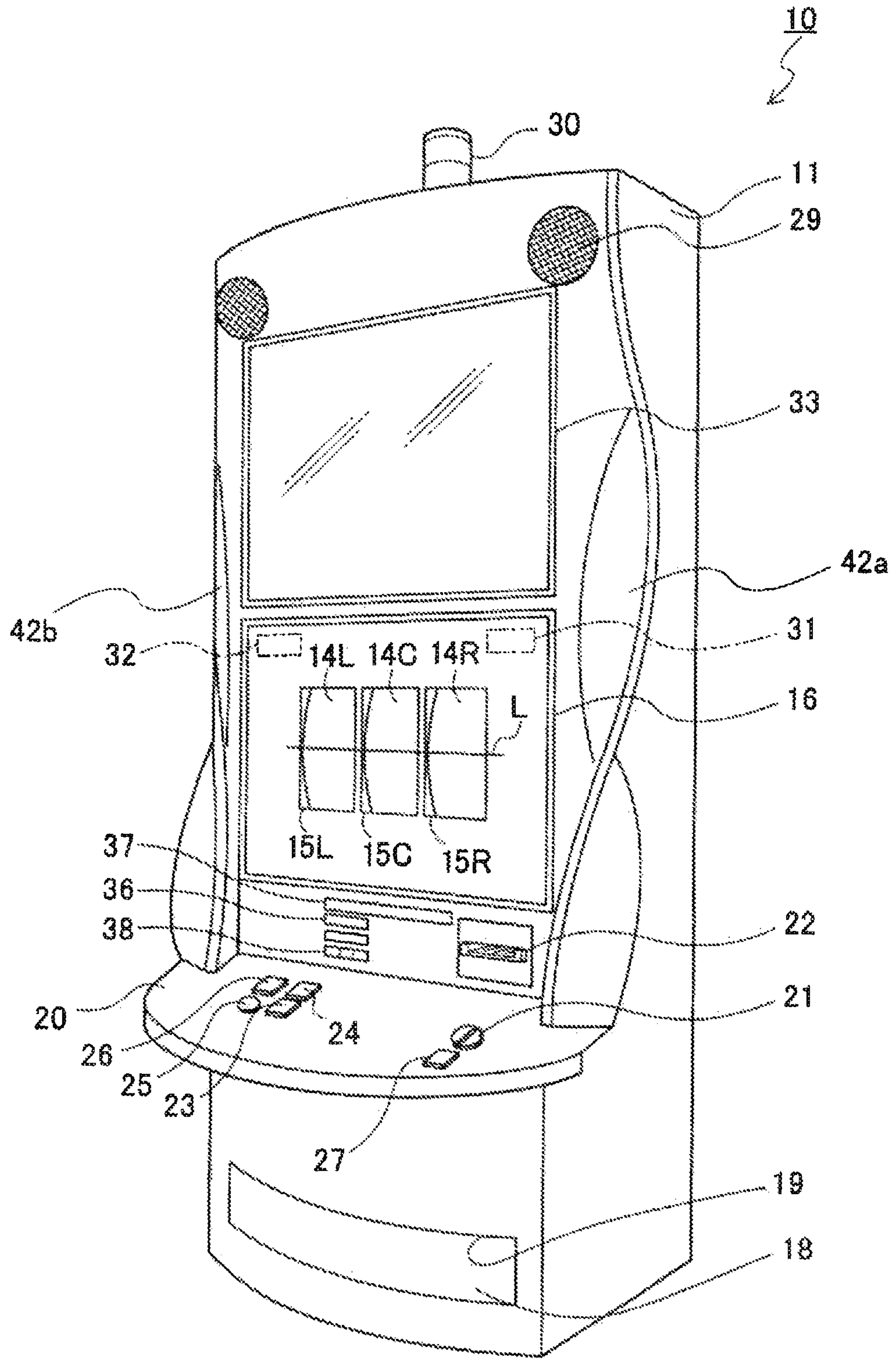
FIG. 1 is a perspective schematic view illustrating a gaming machine according to an embodiment of the present invention.

A slot machine 10 according to an embodiment of the present invention includes: an upper image display panel 33 and a lower image display panel 16, each of which is a display for displaying images; a display window 15 which is a symbol display device; a touch panel 69 which is an input device. With such an arrangement, when a predetermined amount of credits are inserted, the mode is switched from a non-insurance mode to an insurance mode according to the input operation via the touch panel 69. In the insurance mode to which switching has thus been performed, only in a case where determination has been made that the amount of credits thus bet on a game matches the maximum bet amount, the number of games is counted. Furthermore, in this case, the slot machine displays the difference between the number of games thus counted and a predetermined number. When the number of games thus counted reaches the predetermined number, a predetermined amount of credits are paid out. Accordingly, only in a case where the slot machine has determined that the amount of credits matches the maximum bet amount, the number of games is counted in the insurance mode. Such an arrangement provides fairness among the players who can receive prizes in the games. In addition, such an arrangement offers the players to play a game with maximum permissible bet amount, thereby providing to the amusement facilities such as casinos the advantage of increased earnings. Furthermore, such an arrangement displays the difference between the number of games thus counted and the predetermined number, thereby preventing the players from losing interest in the game until the number of games reaches the predetermined number. Moreover, the slot machine 10 rouses the players' interest before playing the game. A description is provided below regarding the present embodiment with reference to the drawings.

FIG. 1 is a perspective schematic view illustrating a gaming machine according to an embodiment of the present invention. A gaming machine 10 according to the present embodiment is a slot machine. Note that the gaming machine according to the present invention is not restricted to a slot machine. For example, the gaming machine 10 may be a single gaming machine such as a video slot machine, video card gaming machine, etc. In addition, the gaming machine 10 may be a so-called mass gaming machine (multi-terminal gaming machine), such as a horse racing gaming machine, a bingo gaming machine, a lottery gaming machine, etc., which requires that a predetermined period of time must elapse before the game results are displayed.

At the gaming machine 10, the player plays a game using coins or bills, or equivalent electronic value information. Note that the credits used in the present invention are not restricted in particular. Examples of credits include medals, tokens, and electronic money.

The gaming machine 10 includes a cabinet 11. The cabinet 11 includes three reels 14 (14L, 14C, and 14R) provided rotatably therewithin. A symbol sequence comprising 22 designs (referred to as "symbols" hereinafter) is depicted on the outer face of each reel 14.

The lower image display panel 16 is provided in the form of a front panel that covers these reels 14. The lower image display panel 16 includes a transparent liquid crystal panel 16, which displays various kinds of information with respect to the game or images for providing visual effects in the game. The lower image display panel 16 serves as an output device for displaying an image according to the present invention. The lower image display panel 16 includes a credit amount display unit 31 and a payout amount display unit 32. The credit amount display unit 31 displays the number of coins inserted as the credits in the form of an image. The payout amount display unit 32 provides a function whereby, in a case where the symbol combination rearranged on the pay line matches a predetermined combination, the number of coins to be paid out is displayed in the form of an image.

The lower image display panel 16 includes three display windows 15 (15L, 15C, and 15R) provided in a form that allows the area behind the panel to be visually confirmed. With such an arrangement, the player can visually identify the three symbols depicted on the outer face of the corresponding reel 14 by way of each display window 15. The lower image display panel 16 has a single pay line that extends across the three display windows 15 along the horizontal direction. The pay line determines the symbol combination. When the symbol combination rearranged along the pay line matches a predetermined combination, a predetermined number of coins is paid out according to the combination and the number of coins inserted (BET amount).

It should be noted that an arrangement may be made according to the present invention in which multiple pay lines are formed such that each line extends across the three display windows 15 in the horizontal direction or in oblique directions. With such an arrangement, these pay lines are set to active pay lines according to the number of coins inserted. In a case where the symbol combination rearranged along any one of the active pay lines matches a predetermined combination, a predetermined number of coins are paid out according to the combination thus rearranged.

Furthermore, an unshown touch panel 69 is provided in front of the lower image display panel 16, which allows the player to input various kinds of instructions via the touch panel 69.

The units provided below the lower image display panel 16 include: a control panel 20 including multiple buttons 23 through 27, which allows the player to input instructions for advancing the game; a coin reception opening 21 which receives coins so that they are stored in the cabinet 11; and a bill identifying unit 22.

The control panel 20 includes a spin button 23, a change button 24, a cash out button 25, a 1-BET button 26, and a maximum BET button 27. The spin button 23 allows the player to input an instruction to start the reels 14 rotating. The change button 24 is used to call the staff of the amusement facility and request that they make change for the player. The cash out button 25 allows the player to input an instruction to pay out the coins, which are stored as the credits, to a coin tray 18.

The 1-BET button 26 allows the player to input an instruction to bet a single coin on the game. The maximum BET button 27 allows the player to input an instruction to bet, from the coins stored as the credits, the maximum number of coins (50 coins in the present embodiment) which the player can bet on a single game.

It should be noted that in the present invention, the phrase "credits are inserted" indicates that the credits are spent. Examples of the situations in which credits are spent include: a situation in which the credits are bet on the game; and a situation in which the credits are spent on switching the game mode to the insurance mode, as described later. For example, let us consider an arrangement in which the coins inserted into the coin reception opening 21 are directly bet on the game. With such an arrangement, the insertion of the coins into the coin reception opening 21 corresponds to the insertion of credits. On the other hand, let us consider an arrangement in which the coins inserted into the coin insertion opening 21 are temporarily stored as the credits, and upon the player operating the 1-BET button 26 or the maximum BET button 27, the coins thus stored as the credits are bet on the game, as with the present embodiment. With such an arrangement, using the coins stored as credits for betting on the game corresponds to the insertion of credits.

The bill identifying unit 22 identifies whether or not a bill is genuine, and stores the bill thus determined to be genuine in the cabinet 11.

The upper image display panel 33 is provided on the front of the cabinet 11. The upper image display panel 33 includes a liquid crystal panel which displays images for visual effects, images for introducing the game, and images for explaining the rules of the game. With the present embodiment, the upper image display panel 33 serves as an output device for images according to the present invention, in the same way as the lower image display panel 16. Note that an arrangement may be made according to the present invention in which either the lower image display panel 16 or the upper image display panel 33 serves as the output device for the images.

Furthermore, the cabinet 11 includes a speaker 29. The speaker 29 serves as an audio output device according to the present invention. A card reader 36, a data indicator 37, and a keypad 38 are provided underneath the lower image display panel 16.

The card reader 36 allows the player to read out data from a smart card, and to write data to the smart card. The smart card is a card possessed by the player that stores data for identifying the player, and data with respect to the history of the games played by the player. In addition, the smart card stores data that corresponds to coins, bills, or credits. Moreover, a magnetic stripe card may be employed instead of the smart card. The data indicator 37 comprises a fluorescent display or the like, for displaying the data read out via the card reader 36 or the data input by the player via the keypad 38.

FIG. 2 is a schematic diagram illustrating symbol sequences, each of which is depicted on the outer face of a corresponding reel. A symbol sequence including 22 symbols is depicted on the outer face of each of the left reel 14L, the center reel 14C, and the right reel 14R. The symbol sequences depicted on these reels 14 differ from one another. Each symbol sequence includes a combination of symbols, i.e., a "DO" symbol, "3B" symbol, "2B" symbol, "CHERRY" symbol, "1B" symbol, "PLUM" symbol, "AB" symbol, and "APPLE" symbol.

Figures 14, 15:
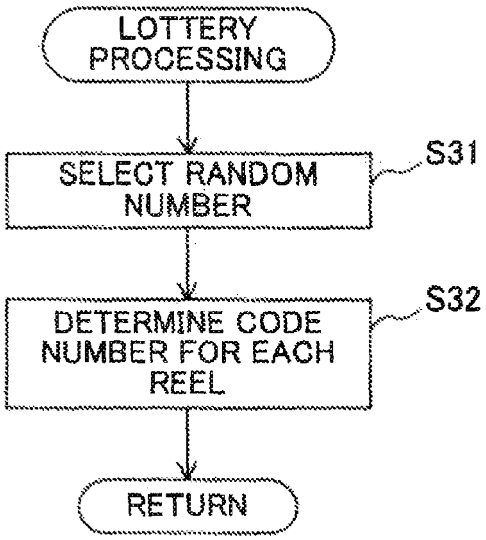
FIG. 14 is a flowchart illustrating a subroutine for lottery processing.
FIG. 15 is a diagram illustrating multiple kinds of awards, and the relation between the probability for each award that a player will win an award and the payout amount.

In a case where the three symbols rearranged along the pay line are three "DO" symbols, three "3B" symbols, three "2B" symbols, three "CHERRY" symbols, three "1B" symbols, three "PLUM" symbols, or three "AB" symbols, a predetermined amount of credits are added to the credits possessed by the player (see FIG. 15). In addition, in a case where only one or two "CHERRY" symbols are rearranged along the pay line, a predetermined amount of credits is added to the credits possessed by the player according to the number of "CHERRY" symbols thus rearranged (see FIG. 15).

The "APPLE" symbol is a bonus game trigger symbol (which is a symbol that switches the game stage to the bonus game stage). In a case where three "APPLE" symbols are rearranged along the pay line, the game stage can be switched to the bonus game stage. With the present embodiment, the bonus game is a free game (which allows the player to play the game a predetermined number of times without the need to bet coins on the game).

The bonus game according to the present invention is not particularly restricted, as long as the bonus game provides an advantageous game state for the player. The advantageous game state is not particularly restricted, as long as such a state provides the player with an advantage when compared with the normal game state (the game state other than the game state of the bonus game or the game state in the cashback mode). Examples of such advantageous game states include: a state that provides the player with a chance to win a greater amount of credits than in the normal game state; a state in which the probability of the player winning credits is higher than it is in the normal game state; a state in which the player can play the game by spending a smaller amount of credits than in the normal game state, etc. Specific examples of the bonus games include a free game, a second game, a mystery bonus game, etc.

When the spin button 23 is depressed after the 1-BET button 26 or the maximum BET button 27 has been depressed so as to start the game, the rotation of the reels 14 causes the sequence of symbols depicted on each reel 14 to be displayed through the display window 15 in motion from the top to bottom. Then, each reel 14 stops rotating after a predetermined period of time, whereupon the symbols are rearranged in the display windows 15. Furthermore, various kinds of awards (see FIG. 15), each corresponding to a symbol combination, are predetermined. When a combination of the symbols, which is stationary after being rearranged, along the pay line matches any one of the awards, a predetermined amount of coins are paid out according to the award, and are added to the credits possessed by the player. In addition, in a case where the symbol combination thus rearranged corresponds to the bonus game trigger, the player wins the bonus game.

Figure 3:
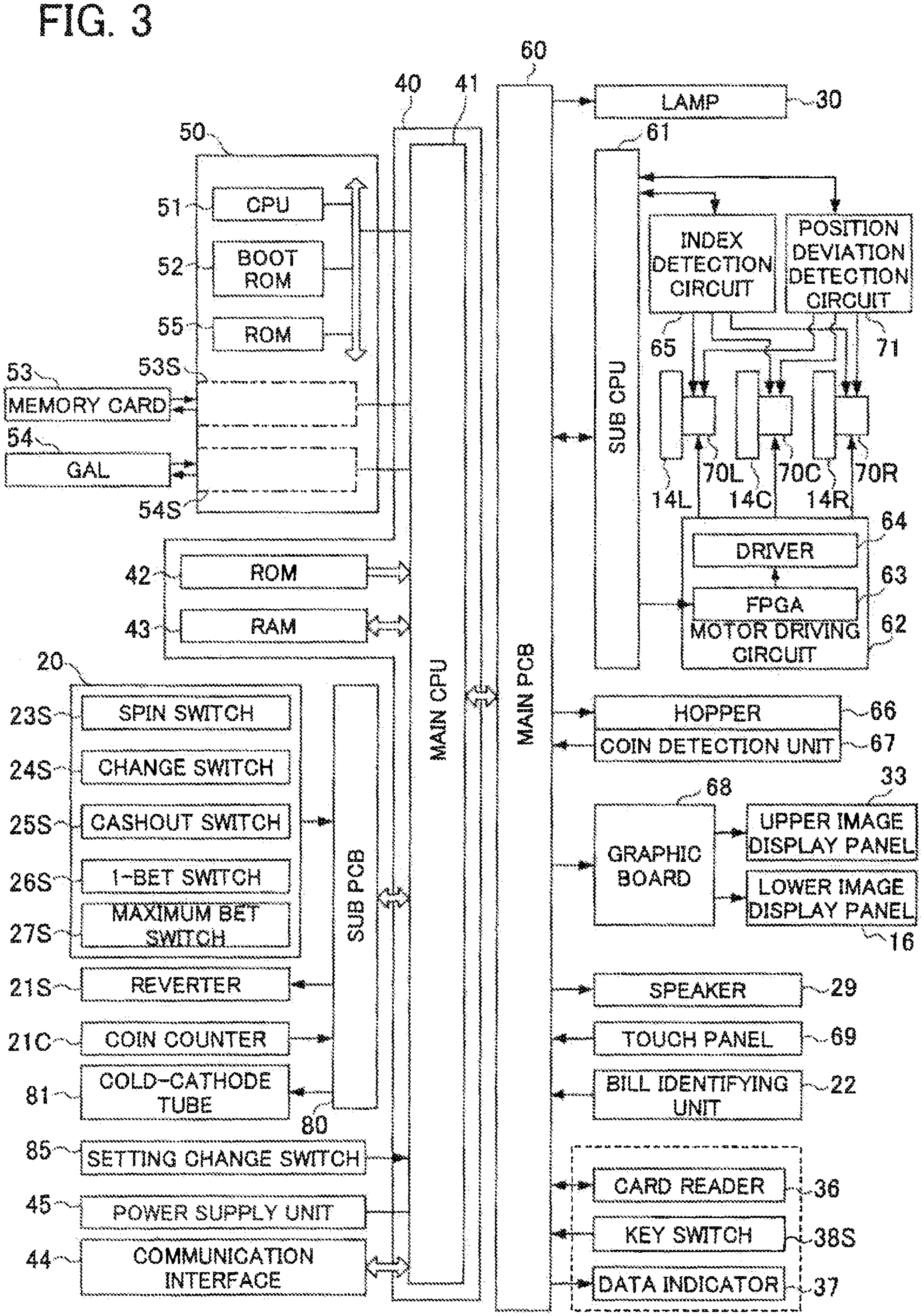
FIG. 3 is a block diagram illustrating an internal configuration of the gaming machine shown in FIG. 1.

FIG. 3 is a block diagram illustrating an internal configuration of the gaming machine shown in FIG. 1. A gaming board 50 includes a CPU (Central Processing Unit) 51, ROM 55 and boot ROM 52, a card slot 53S compatible with a memory card 53, an IC socket 54S compatible with a GAL (Generic Array Logic) 54, which are connected to one another via an internal bus.

The memory card 53 comprises a nonvolatile memory such as compact flash (trademark) or the like, which stores a game program and a game system program. The game program includes a lottery program. The aforementioned lottery program is used for determining the symbol (code number that corresponds to the symbol) rearranged along the pay line for each reel 14. The aforementioned lottery program includes symbol weighting data that corresponds to each of multiple kinds of payout ratios (e.g., 80%, 84%, and 88%). The symbol weighting data is data for each of the three reels 14, and indicates the correspondence between the code number of each symbol (see FIG. 2) and one or multiple random numbers in a predetermined number range (0 to 256). The payout ratio is determined based upon the payout ratio setting data output from the GAL 54. The lottery is performed based upon the symbol weighting data that corresponds to the payout ratio.

Furthermore, the card slot 53S has a configuration that allows the memory card 53 to be detachably inserted, and is connected to the motherboard 40 via an IDE bus. Such an arrangement allows the kinds or content of the game provided by the gaming machine 10 to be changed by performing the following operation. More specifically, the memory card 53 is first extracted from the card slot 53S, and another game program and another game system program are written to the memory card 53. Then, the memory card 53 thus rewritten is inserted into the card slot 53S. In addition, the kinds or content of the games provided by the gaming machine 10 can be changed by replacing the memory card 53 storing a game program and a game system program with another memory card 53 storing another game program and game system program. The game program includes: a program for advancing the game; a program for providing a bonus game; and a program for providing a cashback mode. Furthermore, the game program includes: image data and audio data which are output in the game; and image data and audio data used to notify the player that the game mode has been switched to the insurance mode.

The GAL 54 is a kind of PLD that has a fixed OR array structure. The GAL 54 includes multiple input ports and output ports. Upon reception of predetermined data via each input port, output data that corresponds to the input data is output via the corresponding output port. The data thus output via each output port is the aforementioned payout ratio setting data. On the other hand, IC socket 54S has a structure that allows the GAL 54 to be detachably mounted, and is connected to the motherboard 40 via a PCI bus. Such an arrangement allows the payout ratio setting data, which is output from the GAL 54, to be changed by performing the following operation. Specifically, the GAL 54 is first extracted from the IC socket 54S, and the program stored in the GAL 54 is replaced. Then, the GAL 54 is mounted to the IC socket 54S. Furthermore, the payout ratio setting data can be changed by replacing the GAL 54 with another GAL 54.

The CPU 51, the ROM 55, and the boot ROM 52, which are connected to one another via the internal bus, are connected to the motherboard 40 via the PCI bus. The PCI bus provides signal transmission between the motherboard 40 and the gaming board 50. Furthermore, electric power is supplied from the motherboard 40 to the gaming board 50 via the PCI bus. The ROM 55 stores the country identification information and an authentication program. The boot ROM 52 stores a preliminary authentication program, a program (boot code) which instructs the CPU 51 to start up the preliminary authentication program, etc.

The authentication program is a program (forgery check program) for authenticating the game program and the game system program. The authentication program is defined to follow the procedure (authentication procedure) for confirming and authenticating that the game program and the game system program, which are to be acquired after the authentication, have not been forged, i.e., the procedure for authenticating the game program and the game system program. The preliminary authentication program is a program for authenticating the aforementioned authentication program. The preliminary authentication program is defined to follow the procedure for authenticating that the authentication program has not been forged, i.e., the procedure for authenticating the authentication program (authentication procedure).

The motherboard 40 includes a commercially available motherboard (a printed circuit board connected to basic components of a personal computer), and includes a main CPU 41, ROM (Read Only Memory) 42, and RAM (Random Access Memory) 43. The main CPU 41 is a computation processing device according to the present invention.

The ROM 42 comprises a memory device such as flash memory or the like, and stores programs to be executed by the main CPU 41 such as the BIOS (Basic Input/Output System) etc., and permanent data. Upon the main CPU 41 executing the BIOS, predetermined peripheral devices are initialized, and the game program and the game system program stored in the memory card 53 are acquired by way of the gaming board 50. It should be noted that with the present invention, replacement of the content stored in the ROM 42 may or may not be permitted.

The RAM 43 stores data and programs used for operating the main CPU 41. Furthermore, the RAM 43 can store the authentication program, the game program, and the game system program, which are read out by way of the gaming board 50. The RAM 43 is a storage device according to the present invention.

Furthermore, the RAM 43 has a storage region provided for storing an insurance mode flag. The insurance mode flag is a flag indicating whether the game mode is the insurance mode or in the non-insurance mode. The insurance mode flag storage region includes a storage region of a predetermined amount of bits, for example. The insurance mode flag exhibits the "ON state" or "OFF state" according to the content stored in this storage region. The "ON state" of the insurance mode flag indicates that the game mode is in the insurance mode. On the other hand, the "OFF state" of the insurance mode flag indicates that the game mode is in the non-insurance mode. Moreover, the RAM 43 stores the credit amount and the data such as the credit amount inserted for each game, the credit amount paid out for each game, etc. In addition, the RAM 43 has a storage region for a game counter for counting the games.

Furthermore, a main PCB (Printed Circuit Board) 60 and a sub-PCB 80 described later are connected to the motherboard 40 via USB. Moreover, a power supply unit 45 is connected to the motherboard 40. Upon electric power being supplied to the motherboard 40 from the power supply unit 45, the main CPU 41 provided to the motherboard 40 starts up. In addition, the electric power is supplied to the gaming board 50 via the PCI bus, which starts up the CPU 41.

Apparatuses and devices, each of which generates an input signal to be input to the main CPU 41, are connected to the main PCB 60 and the sub-PCB 80. Furthermore, apparatuses and devices, having operations controlled according to control signals output from the main CPU 41, are connected to the main PCB 60 and the sub-PCB 80. According to the input signal input to the main CPU 41, the main CPU 41 executes the game program and the game system program stored in the RAM 43, which provides a function of executing predetermined computation processing and storing the computation results in the RAM 43, and a function of executing control processing for the apparatuses and devices in the form of transmission of a corresponding control signal to each of the apparatuses and devices.

More specifically, a lamp 30, a sub-CPU 61, a hopper 66, a coin detection unit 67, a graphic board 68, a speaker 29 which serves as an output device, the touch panel 69, the bill identifying unit 22, the card reader 36, a key switch 38S, and the data indicator 37 are connected to the main PCB 60. The lamp 30 blinks in a predetermined pattern according to the control signal output from the main CPU 41.

The sub-CPU 61 controls the starting and stopping of the rotation of the reels 14 (14L, 14C, and 14R). An FPGA (Field Programmable Gate Array) 63 and a motor driving circuit 62 including a driver 64 are connected to the sub-CPU 61. The FPGA 63 is a programmable electronic circuit such as an LSI etc, which serves as a control circuit for a stepping motor 70. The driver 64 has a function as an amplification circuit for pulses to be input to the stepping motor 70. The stepping motors 70 (70L, 70C, and 70R), which rotate the respective reels 14, are connected to the motor driving circuit 62. Each stepping motor 70 is a single- or two-phase stepping motor.

With the present invention, the driving method for each stepping motor is not particularly restricted. For example, a two-phase driving method or a single-phase driving method may be employed. In addition, a DC motor may be employed instead of each stepping motor. Let us consider an arrangement that employs DC motors. With such an arrangement, a deviation counter, a D/A converter, and a servo amplifier are connected in that order to the sub-CPU 61, and each DC motor is connected to the servo amplifier. Furthermore, the rotational position of each DC motor is detected by a rotary encoder. The rotary encoder supplies the current rotational position of each DC motor to the deviation counter as data.

Furthermore, an index detection circuit 65 and a position deviation detection circuit 71 are connected to the sub-CPU 61. The index detection circuit 65 detects the position (index described later) of each reel 14 as it rotates. Furthermore, the index detection circuit 65 has a function of detecting if any of the reels 14 are out of step. It should be noted that a detailed description is provided later with reference to the drawings regarding the control of the starting operation and stopping operation of the reels 14.

The position deviation detection circuit 71 detects deviations in the position of each reel 14 after the reels 14 have stopped rotating. For example, the position deviation detection circuit 71 detects a deviation in the positions of the reels 14 when they are stationary by way of the player forcibly altering the positions of the reels 14 in such a manner as to create a particular symbol combination that matches a winning symbol combination, even though the player should not achieve the winning symbol combination in this stage. The position deviation detection circuit 71 has a configuration for detecting fins (not shown) mounted on the inner side of each reel 14, for example, thereby detecting deviations in the positions of the reels 14 when they are stationary.

The hopper 66 is provided within the cabinet 11, and pays out a predetermined amount of coins to the coin tray 18 via a coin payout opening 19 according to a control signal output from the main CPU 41. The coin detection unit 67 is provided within the coin payout opening 19. Upon detection of the payout of a predetermined amount of coins via the coin payout opening 19, the coin detection unit 67 outputs an input signal to the main CPU 41.

The graphics board 68 controls the image display operation for the upper image display panel 33 and the lower image display panel 16, each of which serves as an output device, according to control signals output from the main CPU 41. The credit amount display unit 31 provided at the lower image display panel 16 displays the credit amount stored in the RAM 43. On the other hand, the payout amount display unit 32 provided at the lower image display panel 16 displays the number of coins paid out. The graphic board 68 includes a VDP (Video Display Processor), which generates image data based on the control signal output from the main CPU 41, a video RAM which temporarily stores image data thus created by the VDP, and the like. It should be noted that the image data used by the VDP for creating the image data is included in the game program which has been read out from the memory card 53, and has been stored in the RAM 43.

The bill identifying unit 22 checks whether or not a bill is genuine. In a case where the bill thus checked is genuine, the bill is accepted and stored in the cabinet 11. Upon reception of a genuine bill, the bill identifying unit 22 outputs an input signal to the main CPU 41 based upon the value of the bill thus received. The main CPU 41 stores the credit amount in the RAM 43 according to the value of the bill transmitted in the form of the input signal.

The card reader 36 reads out the data from the smart card, and transmits the data thus read out to the main CPU 41. Furthermore, the card reader 36 writes data to the smart card according to the control signal received from the main CPU 41. The key switch 38S is provided on the keypad 38. Upon the player operating the keypad 38, the key switch 38S outputs a predetermined input signal to the main CPU 41. The data indicator 37 displays the data read out via the card reader 36 or the data input by the player via the keypad 38 according to the control signal output from the main CPU 41.

The control panel 20, a reverter 21S, a coin counter 21C, and a cold-cathode tube 81 are connected to the sub PCB 80. The control panel 20 includes a spin switch 23S that corresponds to the spin button 23, a change switch 24S that corresponds to the change button 24, a CASHOUT switch 25S that corresponds to the CASHOUT button 25, a 1-BET switch 26S that corresponds to the 1-BET button 26, and a maximum BET switch 27S that corresponds to the maximum BET button 27. Upon the player operating any one of these buttons 23 through 27, the corresponding switch from among the switches 23S through 27S outputs an input signal to the main CPU 41.

The coin counter 21C is provided within the coin reception opening 21, and checks whether or not a coin inserted by the player via the coin reception opening 21 is genuine. Coins other than those thus determined to be genuine are discharged via the coin payout opening 19. Furthermore, upon detection of a genuine coin, the coin counter 21C outputs an input signal to the main CPU 41.

The reverter 21S operates according to a control signal output from the main CPU 41. The reverter 21S provides a function whereby, in a case that the coin counter 21C has determined that a coin is genuine, the coin thus determined to be genuine is transferred to a cash box (not shown) provided within the gaming machine 10 or the hopper 66. That is, in a case where the hopper 66 is filled with coins, the coins thus determined to be genuine are transferred to the cash box by the reverter 21S. The cold-cathode tube 81 has a function as a backlight provided on the back face side of the lower image display panel 16 and the upper image display panel 33. The cold-cathode tube 81 emits light according to a control signal output from the main CPU 41.

Figure 4:
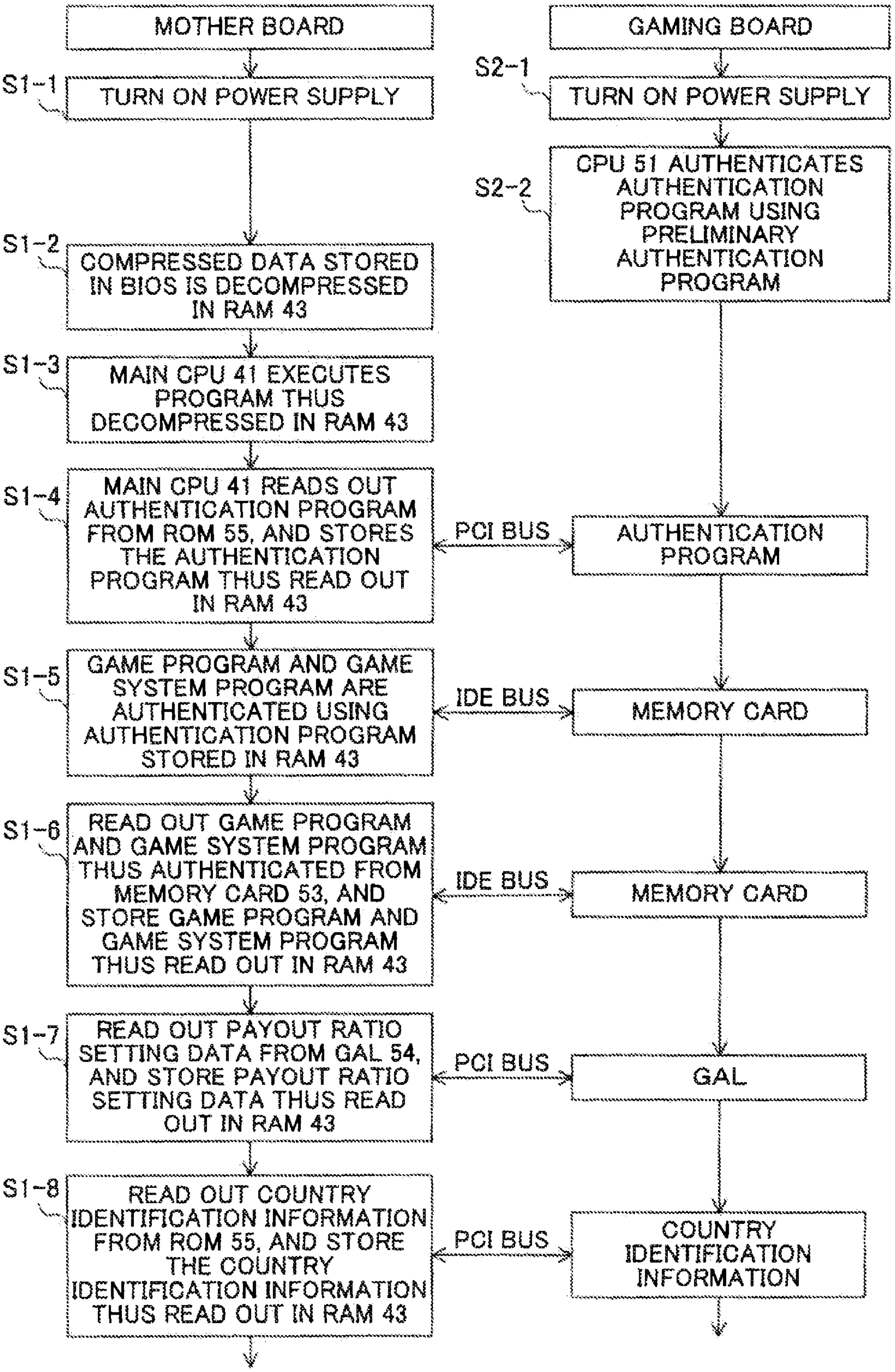
FIG. 4 is a flowchart illustrating a procedure of the authentication readout processing for acquiring a game program and a game system program, which is performed by the mother board and the gaming board shown in FIG. 3.

Next, a description is provided regarding the processing performed by the gaming machine 10. FIG. 4 is a flowchart illustrating a procedure for authentication readout processing performed by the motherboard 40 and the gaming board 50 shown in FIG. 3 for reading out the game program and the game system program. Here, let us say that the memory card 53 has been inserted into the card slot 53S provided to the gaming board 50, and the GAL 54 has been mounted to the IC socket 54S.

First, when the power supply switch for the power supply unit 45 is turned on (upon supplying power), the motherboard 40 and the gaming board 50 start up (Steps S1-1 and S1-2). After the motherboard 40 and the gaming board 50 start up, separate procedures are executed in parallel. That is, in the gaming board 50, the CPU 51 reads out the preliminary authentication program stored in the boot ROM 52, and a preliminary authentication is performed so as to confirm and authenticate that the authentication program has not been forged before the authentication program is read out (Step S2-2). On the other hand, in the motherboard 40, the main CPU 41 executes the BIOS stored in the ROM 42, the compressed data incorporated in the BIOS is decompressed, and the data thus decompressed is stored in the RAM 43 (Step S1-2). Then, the main CPU 41 executes the BIOS thus decompressed and stored in the RAM 43, which performs diagnostic processing and initializing processing for various kinds of peripheral devices (Step S1-3).

In this stage, the ROM 55 provided to the gaming board 50 is connected to the main CPU 41 via the PCI bus. The main CPU 41 reads out the authentication program stored in the ROM 55, and stores the authentication program thus read out in the RAM 43 (Step S1-4). In this step, the main CPU 41 stores the authentication program in the RAM 43 while confirming that the stored data is error-free by performing a checksum according to the ADDSUM method (standard check function), which is a function provided by the BIOS.

Next, after the main CPU 41 has confirmed what is connected to the IDE bus, the main CPU 41 accesses the memory card 53 that has been inserted into the card slot 53S via the IDE bus, and reads out the game program and the game system program from the memory card 53. With such an arrangement, the main CPU 41 reads out the game program data and the game system program data in four byte increments. Subsequently, the main CPU 41 performs authentication processing according to the authentication program stored in the RAM 43, in order to confirm and authenticate that the game program and the game system program thus read out have not been forged (Step S1-5). After the authentication processing has been completed successfully, the main CPU 41 stores the game program and the game system program which were the authentication targets (which have been authenticated) in the RAM 43 (Step S1-6). Next, the main CPU 41 accesses the GAL 54 mounted to the IC socket 54S via the PCI bus, reads out the payout ratio setting data from the GAL 54, and stores the payout ratio setting data thus read out in the RAM 43 (Step S1-7). Then, the main CPU 41 reads out the country identification information stored in the ROM 55 provided to the gaming board 50, and stores the country identification information in the RAM 43 (Step S1-8).

After the aforementioned processing has been performed, the main CPU 41 sequentially reads out the game program and the gaming system program, and executes the programs thus read out, thereby preparing the game.

Figure 5:
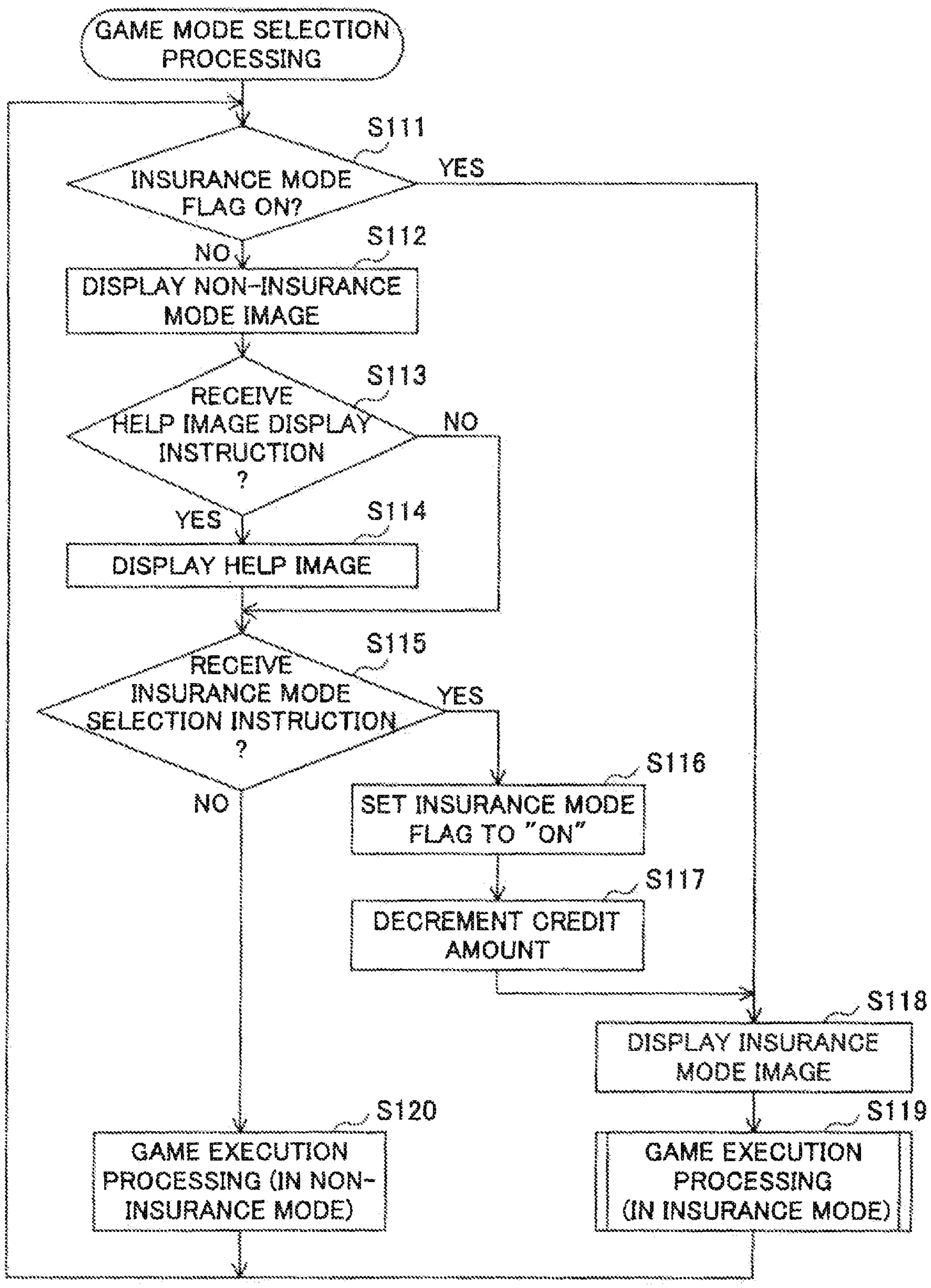
FIG. 5 is a flowchart illustrating a subroutine for game mode selection processing.

After the processing illustrated in FIG. 4 has been performed, the main CPU 41 performs the game mode selection processing. FIG. 5 is a flowchart illustrating a subroutine for the game mode selection processing. It should be noted that during the execution of this subroutine, upon detection of a detection signal output from the coin counter 21C according to detection of a coin inserted via the coin reception opening 21, interrupt processing is performed to add to the credit amount stored in the RAM 43.

First, the main CPU 41 determines whether or not the insurance mode flag is in the "ON state" (Step S111). In a case where determination has been made that the insurance mode flag is not in the "ON state", i.e., when the insurance mode flag is in the "OFF state", the main CPU 41 displays a non-insurance mode image (step S112). In this processing, the main CPU 41 transmits to the graphic board 68 a rendering instruction to display the non-insurance mode image. In the graphics board 68, the VDP extracts image data from the RAM 43, decompresses the image data thus extracted, and stores the image data thus decompressed in the video RAM according to the aforementioned rendering instruction, thereby creating image data for one frame. The image data thus created is output to the upper image display panel 33 and the lower image display panel 16. As a result, the upper image display panel 33 and the lower image display panel 16 display images as shown in FIG. 6, for example.

Figure 6:
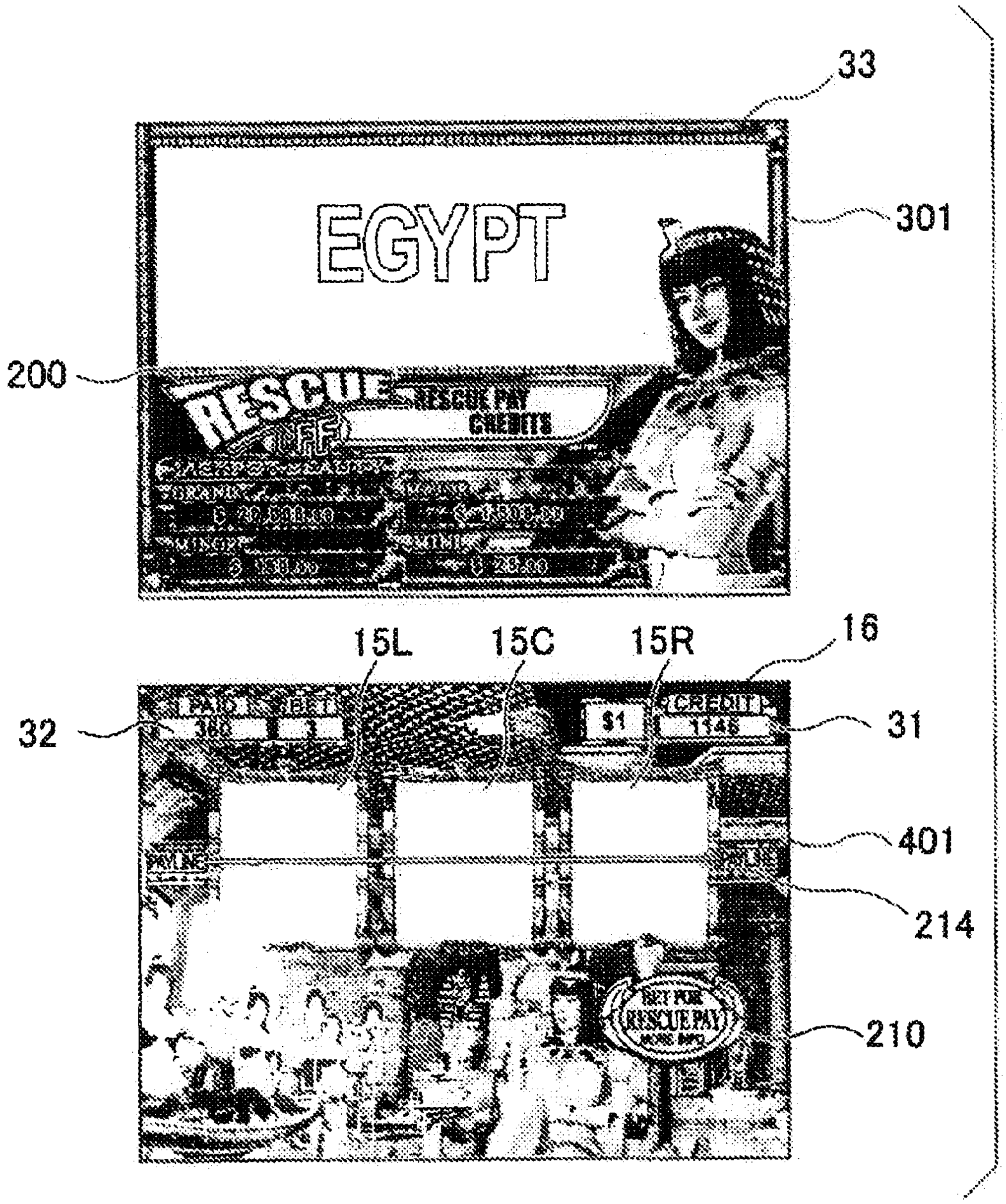
FIG. 6 is a diagram illustrating an example of images displayed on an upper image display panel and a lower image display panel in the non-insurance mode.
Figure 7:
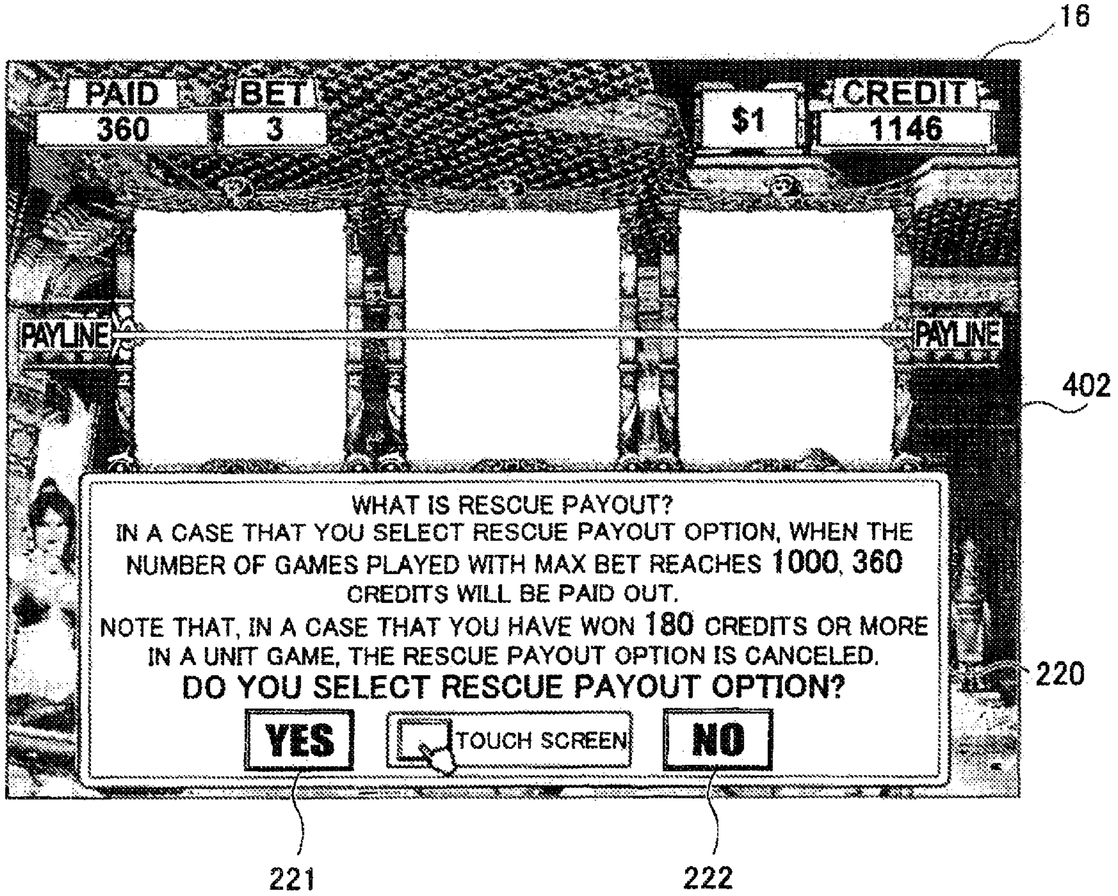
FIG. 7 is a diagram illustrating an example of an image displayed on the lower image display panel, which allows the player to select the insurance mode from the non-insurance mode.

FIG. 6 is a diagram illustrating an example of images (upper image 301 and lower image 401) displayed on the upper image display panel 33 and the lower image display panel 16 in the non-insurance mode. In the lower image 401, the reference numerals 15 (15L, 15C, and 15R) denote display windows. Reference numeral 31 denotes a credit amount display unit. Reference numeral 32 denotes a payout amount display unit. Reference numeral PAYLINE 214 denotes a pay line. Furthermore, an image 210, which shows "BET FOR RESCUE PAY MORE INFO", is displayed in the lower-right portion of the lower image 401. With such an arrangement, upon the player touching a predetermined portion of the touch panel 69 that corresponds to the display region of the image 210, the screen is switched to another screen that allows the player to select the insurance mode. FIG. 7 is a diagram illustrating an example of an image displayed on the lower image display panel, which allows the player to select the insurance mode while in the non-insurance mode. Upon the player touching a predetermined portion of the touch panel 69 that corresponds to the display region of the image 210, a lower image 402 is displayed on the lower image display panel 16. Furthermore, an image 220 is displayed in the lower portion of the lower image 402, which prompts the player to make a selection with respect to the insurance mode. The image 220 thus displayed includes YES 221, which is an image that allows the player to select the insurance mode, and NO 222, which is an image that allows the player to select the non-insurance mode, in addition to a description with respect to a predetermined amount of credit paid out in the cashback mode (rescue payout). With such an arrangement, an instruction is input to select the insurance mode when the player touches a predetermined portion of the touch panel 69 that corresponds to the display region of the YES image 221.

Let us consider a case in which the insurance mode is selected. In this case, when the game count reaches a predetermined number (e.g., 1000) or more without the player acquiring a predetermined amount of credits (180 in the present embodiment) or more in a game unit, and without the player winning any bonus games, the gaming machine 10 transits to the cashback mode. In the cashback mode, the player can acquire a predetermined amount of credits (360 credits in the present embodiment) or coins that correspond to the credits. That is, such an arrangement allows the player to play the game in an insurance mode that provides an insurance function whereby, in a case where the player does not win a predetermined amount of credits or a bonus game over a long period of time, the player is compensated for all of or a part of the lost credits.

On the other hand, in a case where an instruction has not been input to select the insurance mode, the non-insurance mode is selected. Let us consider a case in which the non-insurance mode is selected. In this case, the gaming machine does not transit to the cashback mode even if the player has not won any bonus games over a long period of time.

After the processing in Step S112, the main CPU 41 determines whether or not an instruction has been input to display a help image (Step S113). Upon the player touching a predetermined portion of the touch panel 69, the instruction to display the help image is input.

Upon the input of an instruction to display the help image, the help image is displayed (Step S114). In this processing, the main CPU 41 transmits to the graphic board 68 a rendering instruction to display the help image. The graphic board 68 performs processing for displaying images on the upper image display panel 33 and the lower image display panel 16.

In a case that the processing has been executed in Step S114, or in a case where an instruction has not been input in Step S113 to display the help image, the main CPU 41 determines whether or not an instruction has been input to select the insurance mode (Step S115). As described above, upon the player touching a predetermined portion of the touch panel 69 that corresponds to the YES image 221 included in the image 220, the instruction to select the insurance mode is input.

In a case where the instruction to select the insurance mode is input, the main CPU 41 sets the insurance mode flag stored in the RAM 43 to the "ON state" (Step S116). Subsequently, the main CPU 41 subtracts a predetermined value from the credit amount stored in the RAM 43 (Step S117).

In a case where determination has been made in Step S111 that the insurance mode flag is in the "ON state", or when the processing has been executed in Step S117, the processing is performed for displaying an insurance mode image (step S118). In this processing, the main CPU 41 (computation processing device) transmits to the graphics board 68 a rendering instruction to display an insurance mode image. In the graphics board 68, the VDP extracts image data, which is image data used for images that provide notifications to the player, from the RAM 43 (storage device), decompresses the image data thus extracted, and stores the image data thus decompressed in the video RAM according to the aforementioned rendering instruction, thereby creating image data for one frame. The image data thus created is displayed on the upper image display panel 33 and the lower image display panel 16. As a result, the upper image display panel 33 and the lower image display panel 16 display images as shown in FIG. 8, for example.

Figure 8:
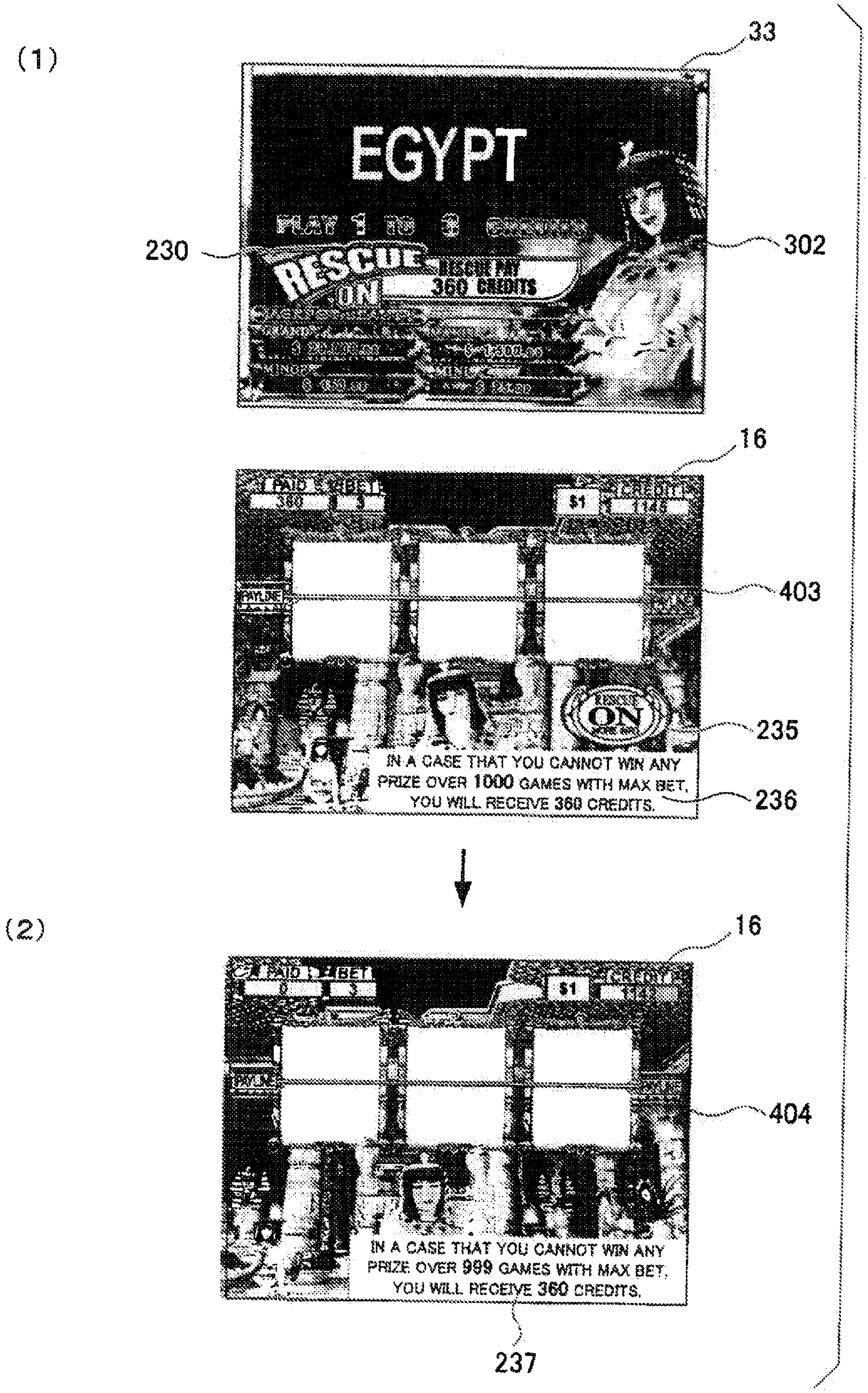
FIG. 8 is a diagram illustrating an example of the images displayed on the upper image display panel and the lower image display panel in the insurance mode.

FIG. 8 is a diagram illustrating an example of the images displayed on the upper image display panel 33 and the lower image display panel 16 in the insurance mode. FIG. 8(1) is a diagram illustrating an example of the images (upper image 302 and lower image 403) displayed on the upper image display panel 33 and the lower image display panel 16 in the insurance mode, which the game mode has been switched to according to the player's operation of selecting the YES 221. In this stage, the player plays the game in the insurance mode. Accordingly, the upper image 302 displays an image 230 that shows "RESCUE ON". On the other hand, an image 235, which shows "RESCUE ON MORE INFO" and indicates that the game mode is in the insurance mode, is displayed in the lower-right portion of the lower image 403. Furthermore, an image 236, which shows "If you do not win any award in 1000 games with the MAX BET, you will receive a rescue payout of 360 credits", which indicates the conditions, etc. according to when the game mode is switched from the insurance mode to the cashback mode, is displayed in the lower-right portion of the lower image 403. Here, the term "MAX BET" as used here represents the maximum bet amount, which is the maximum credit amount that the player can bet on one game.

FIG. 8(2) is a diagram illustrating an example of an image (lower image 404) displayed on the lower image display panel 16 after the player has executed a unit game in the insurance mode. The lower image 404 displays an image 237, which shows "If you do not win any award in 999 games with the MAX BET, you will receive a rescue payout of 360 credits", indicating information with respect to the number of remaining games, and is a condition for switching to the cashback mode (in which credits are paid out as rescue payout).

After the processing in Step S118, the main CPU 41 performs game execution processing according to the insurance mode (Step S119). A description is provided below later regarding this processing with reference to FIG. 9. In brief, in the insurance mode, the upper image display panel 33 displays the upper image 302, and the lower image display panel 16 displays the lower image 403.

On the other hand, in a case where an instruction has not been input in Step S115 to select the insurance mode, the main CPU 41 performs the game execution processing according to the non-insurance mode (Step S120). This processing is approximately the same as that according to the insurance mode (see FIG. 9), except that the main CPU 41 does not perform the processing for switching the game mode to the cashback mode, and does not perform the processing for counting the games. Accordingly, a description of the game processing according to the non-insurance mode is omitted here. After the execution of the processing in Step S119 or S120, the flow returns to Step S111.

A description has been provided in the present embodiment regarding an arrangement in which, based upon the notification data, the upper image display panel 33 and the lower image display panel 16, each of which serves as an output device, display the upper image 302 and the lower image 403, respectively, each of which notifies the player that the game mode has been switched to the insurance mode. Furthermore, an arrangement may be made according to the present invention in which the speaker 29, which serves as an output device, outputs sound based upon the notification data, which notifies the player that the game mode has been switched to the insurance mode.

Figure 9:
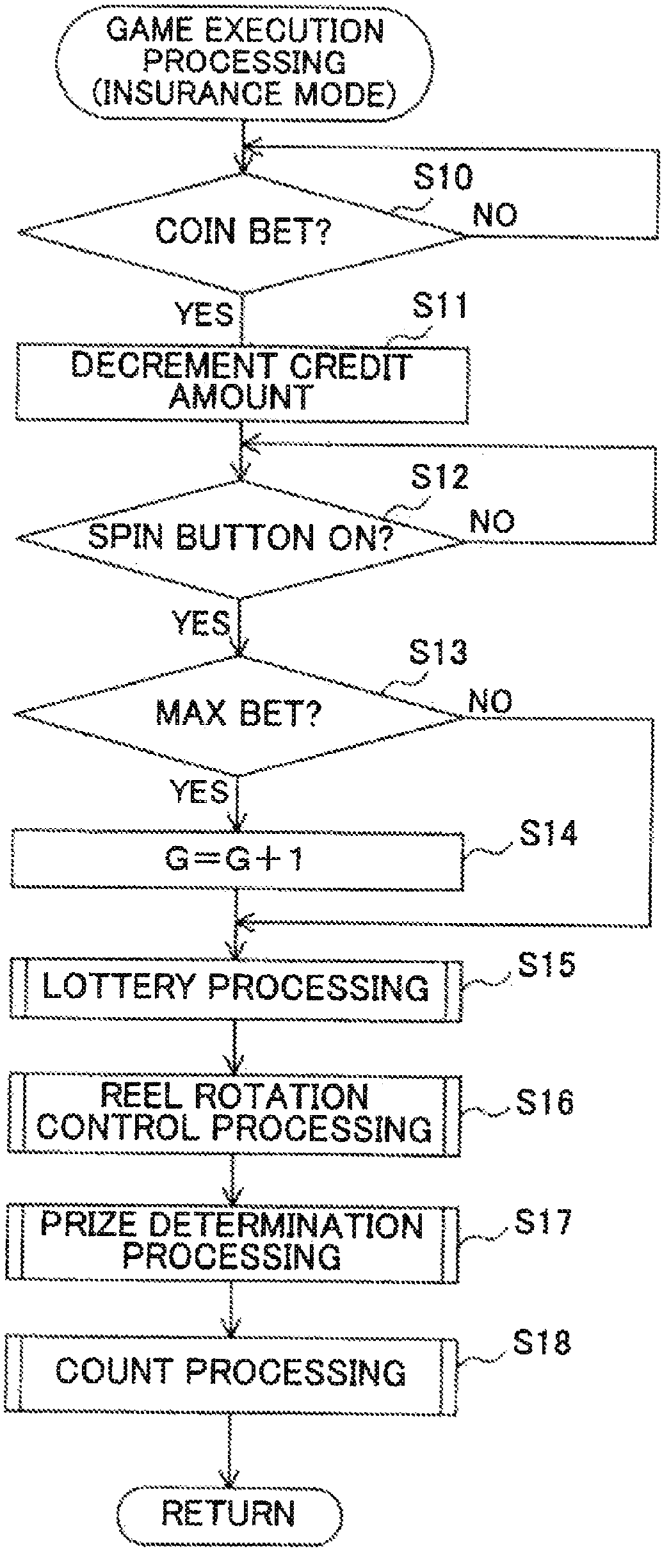
FIG. 9 is a flowchart illustrating a subroutine for game execution processing.

FIG. 9 is a flowchart illustrating a subroutine for the game execution processing in the insurance mode, which is called and executed in Step S119 of the subroutine shown in FIG. 5. In this flowchart, the value used by the game counter for counting the games is represented by G.

In the game execution processing, the main CPU 41 first determines whether or not the player has bet any coins (Step S10). In this processing, the main CPU 41 determines whether or not the main CPU 41 has received an input signal output from the 1-BET switch 26S according to the player operating the 1-BET button 26, or an input signal output from the maximum BET switch 27S according to the player operating the maximum BET button 27. In a case where the main CPU 41 has determined that the player has not bet any coins, the flow returns to Step S10.

On the other hand, in a case that determination has been made in Step S10 that the player has bet coins, the main CPU 41 subtracts the credit amount stored in the RAM 43 according to the number of coins thus bet (Step S11).

Next, the main CPU 41 determines if the spin button 23 is ON (Step S12). In this processing, the main CPU 41 determines whether or not the main CPU 41 has received an input signal output from the spin switch 23S according to the player pushing the spin button 23. In a case where the main CPU 41 has determined that the spin button 23 is not ON, the flow returns to Step S12. It should be noted that in a case where the spin button 23 is not ON (in a case of reception of an instruction to end the game before the spin button 23 is ON), the main CPU 41 cancels the subtraction results obtained in Step S11.

Next, the main CPU 41 determines whether or not the player has bet the MAX BET credits (Step S13). In this processing, the main CPU 41 determines whether or not the amount thus bet matches the maximum bet amount. In a case where the main CPU 41 has determined that the MAX BET credits have been bet, the main CPU 41 adds to the game count (G) (Step S14). With such an arrangement, in a case that the game mode has switched to the insurance mode, the value of game count (G) is cleared (G is reset to 0).

After the execution of the processing in Step S14, or in a case where determination has been made in Step S13 that the MAX BET credits have not been bet, the main CPU 41 performs lottery processing (Step S15). In the lottery processing, the main CPU 41 (computation processing device) executes a lottery program stored in the RAM 43 (storage device) so as to determine the code number for each reel 14 when it is stationary. Thus, the symbol combination to be rearranged is determined. A detailed description is provided later regarding this processing with reference to FIGS. 14 and 15. It should be noted that the description is made in the present embodiment regarding an arrangement in which the symbol combination to be rearranged is determined, thereby selecting one award from among multiple kinds of awards. In addition, an arrangement may be made according to the present invention in which, one award is first selected from among the multiple kinds of awards by lottery, followed by determining the symbol combination to be rearranged based upon the award thus selected.

Next, the main CPU 41 performs reel rotation control processing (Step S16). In this processing, after all the reels 14 start to rotate, the main CPU 41 stops the rotation of each reel such that the symbol combination rearranged along the pay line matches the symbol combination that corresponds to the award determined in Step S15. A detailed description is provided later regarding this processing with reference to FIGS. 16 to 18. Next, the main CPU 41 determines award determination processing (Step S17). A detailed description is provided later regarding this processing with reference to FIGS. 10 and 11. Next, the main CPU 41 performs count processing (Step S18). A detailed description is provided later regarding this processing with reference to FIG. 12.

Figure 10:
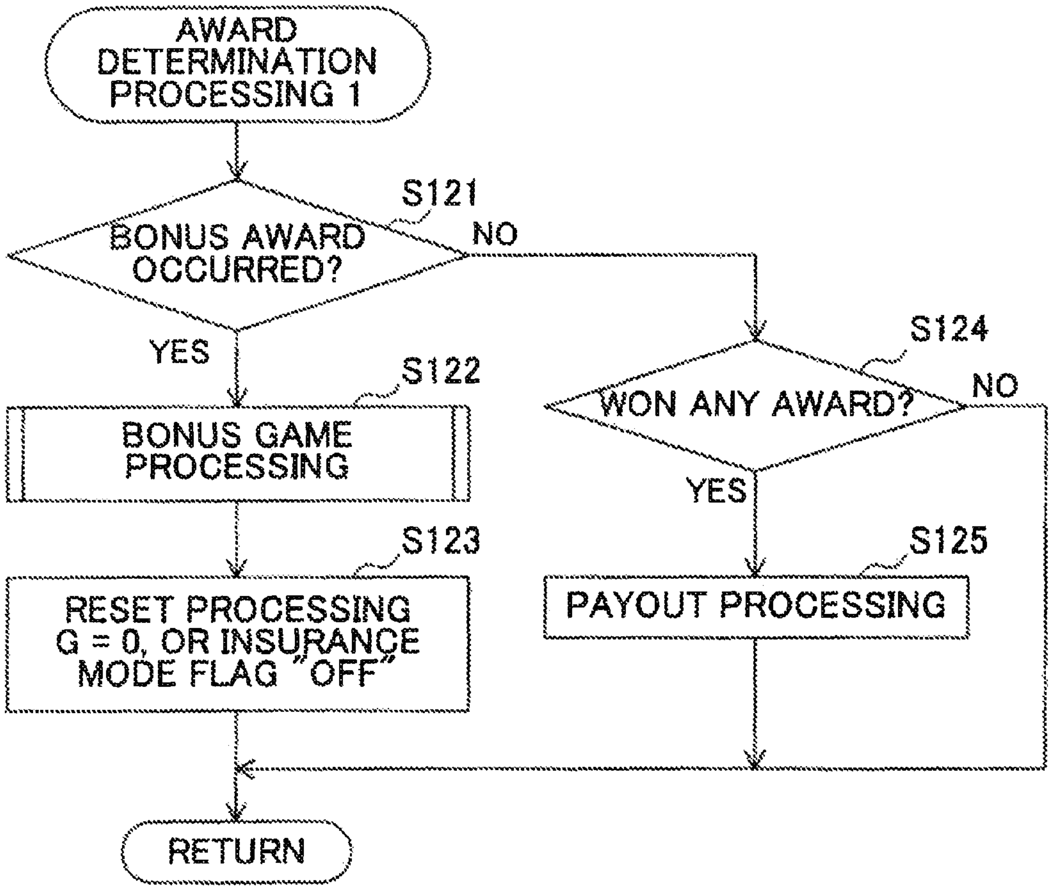
FIG. 10 is a flowchart illustrating a subroutine for award determination processing 1.

FIG. 10 is a flowchart illustrating a subroutine for award determination processing 1, which is an example of a subroutine for the award determination processing that is to be called in Step S17 of the subroutine shown in FIG. 9, thereby executing the award determination processing.

First, the main CPU 41 determines whether or not a bonus trigger has occurred, i.e., whether or not the symbol combination as rearranged in the display windows 15 matches the "APPLE" symbol combination (Step S121). In a case that determination has been made that the bonus game trigger has occurred, the main CPU 41 (computation processing device) reads out a program from the RAM 43 (storage device) for providing a bonus game, and executes the bonus game processing (Step S122). A description is provided later regarding the bonus game processing with reference to FIG. 19.

After the processing in Step S122, the game counter is reset to zero (Step S123). It should be noted that a description has been made regarding an arrangement in which, in such a case, the game counter is reset to zero. In addition, an arrangement may be made in which, in such a case, the game mode switches from the insurance mode to the non-insurance mode (the insurance mode flag is set to the OFF state). With such an arrangement, in a case where the game stage has switched to the bonus game stage, the game mode is returned to the non-insurance mode, thereby providing fairness among the players who can receive awards from the game.

On the other hand, in a case where determination has been made in Step S121 that the bonus game trigger has not occurred, the main CPU 41 determines whether or not the player has won an award (Step S124). In a case where determination has been made that the player has won an award, the main CPU 41 performs payout processing (payout of coins according to the credit amount inserted and the award) (Step S125). In this case, in a mode in which the coins are to be retained, the main CPU 41 adds to the credit amount stored in the RAM 43. On the other hand, in a mode in which the coins are to be paid out, the main CPU 41 transmits a control signal to the hopper 66 so as to pay out a predetermined number of coins. In this case, the coin detection unit 67 counts the number of coins paid out through the hopper 66. When the count value reaches a specified number, the coin detection unit 67 transmits a payout completion signal to the main CPU 41. Upon reception of this signal, the main CPU 41 stops driving the hopper 66, whereupon the coin payout processing ends.

In a case where the main CPU 41 has executed the processing in Step S123 or Step S125, or in a case where determination has been made that the player has not won any award (when determination has been made that the player has lost the game), the main CPU 41 ends this subroutine.

Figure 11:
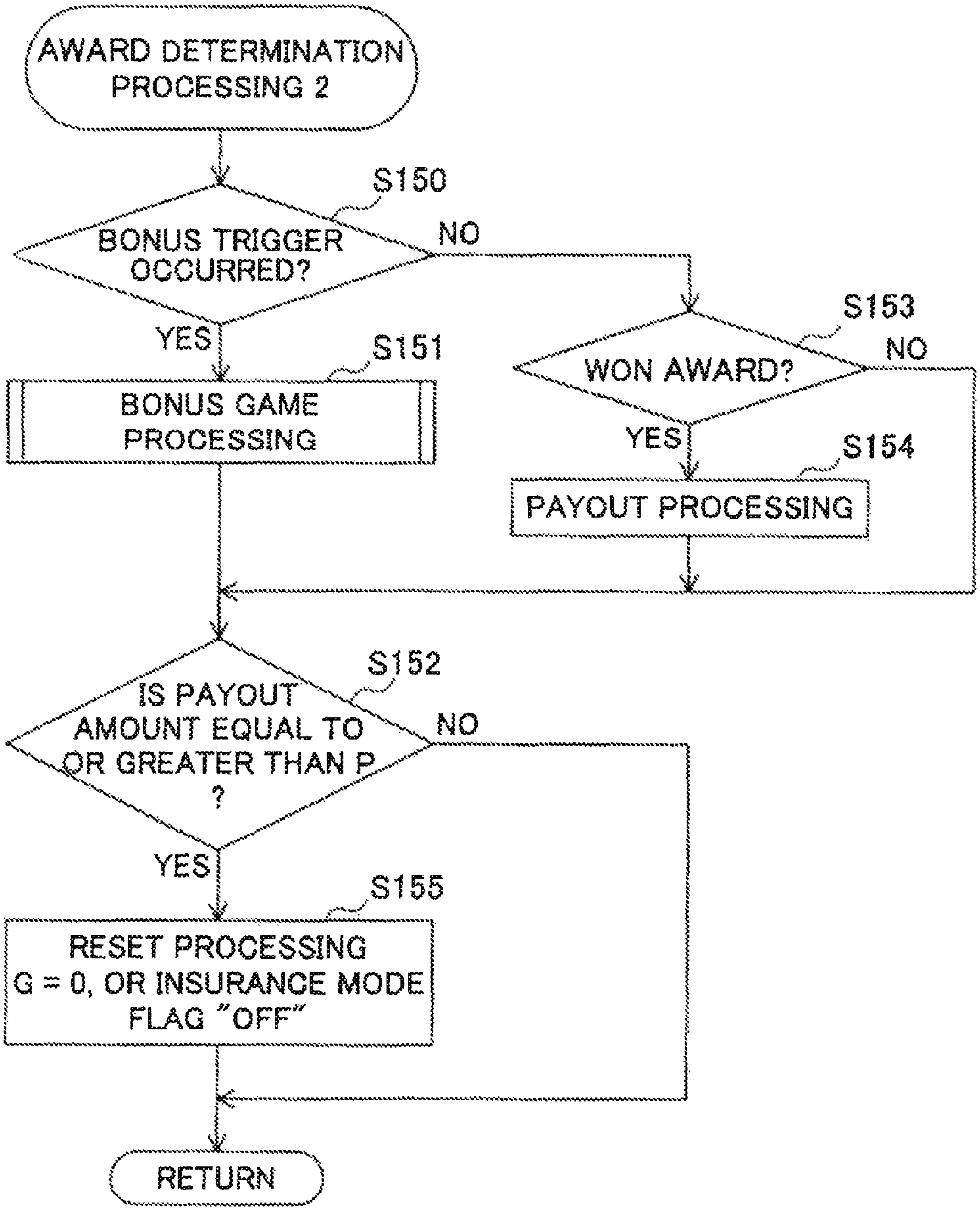
FIG. 11 is a flowchart illustrating a subroutine for award determination processing 2.

FIG. 11 is a flowchart illustrating a subroutine for award determination processing 2, which is another example of a subroutine for award determination processing that is called and executed in Step S17 of the subroutine shown in FIG. 9. A description has been made regarding the award determination processing 1 in which, after the bonus game processing, the game counter is reset to zero (or the insurance mode flag is set to the OFF state). On the other hand, in the award determination processing 2, in a case where the payout amount is at least a predetermined amount, the game count is reset to zero (or the insurance mode flag is set to the OFF state). The predetermined amount is represented by P in this flowchart.

First, the main CPU 41 determines whether or not the bonus game trigger has occurred, i.e., whether or not the symbol combination as rearranged in the display windows 15 matches the "APPLE" symbol combination (Step S150). In a case where determination has been made that the bonus game trigger has occurred, the main CPU 41 (computation processing device) reads out a program from the RAM 43 (storage device) for the bonus game, and executes the bonus game processing (Step S151). A detailed description is provided later regarding the bonus game processing with reference to FIG. 19.

On the other hand, in a case where determination has been made in Step S150 that the bonus game trigger has not occurred, the main CPU 41 determines whether or not the player has won any award (Step S153). In a case where determination has been made that the player has won any award, the main CPU 41 performs the payout processing (payout of coins according to the credit amount inserted and the award) (Step S154). In this case, in a mode in which the coins are to be retained, the main CPU 41 adds to the credit amount stored in the RAM 43. On the other hand, in a mode in which the coins are to be paid out, the main CPU 41 transmits a control signal to the hopper 66 so as to pay out a predetermined number of coins. In this case, the coin detection unit 67 counts the number of coins paid out through the hopper 66. When the count value reaches a specified number, the coin detection unit 67 transmits a payout completion signal to the main CPU 41. Upon reception of this signal, the main CPU 41 stops driving the hopper 66, and the coin payout processing ends.

In a case that the main CPU 41 has executed the processing in Step S151 or Step S154, or in a case that determination has been made that the player has not won any award (in a case that determination has been made that the player has lost the game), a determination is made as whether or not the credit amount paid out is equal to or greater than P (Step S152). In this processing, P represents a predetermined payout amount (180 credits in the present embodiment). In a case that determination has been made that the credit amount paid out is equal to or greater than P, the main CPU 41 resets the game counter to zero. It should be noted that the description has been made regarding an arrangement in which, in such a case, the game counter is reset to zero. Furthermore, an arrangement may be made in which, in such a case, the game mode is switched from the insurance mode to the non-insurance mode (the insurance mode is set to the OFF state). With such an arrangement, in a case where the game stage has switched to the bonus game stage, the game mode is returned to the non-insurance mode, thereby providing fairness among the players who can receive awards from the game.

On the other hand, in a case where determination has been made in Step S152 that the credit amount paid out is not equal to or greater than P, or when the main CPU 41 has executed the processing in Step S155, the main CPU 41 ends this subroutine.

Figure 12:
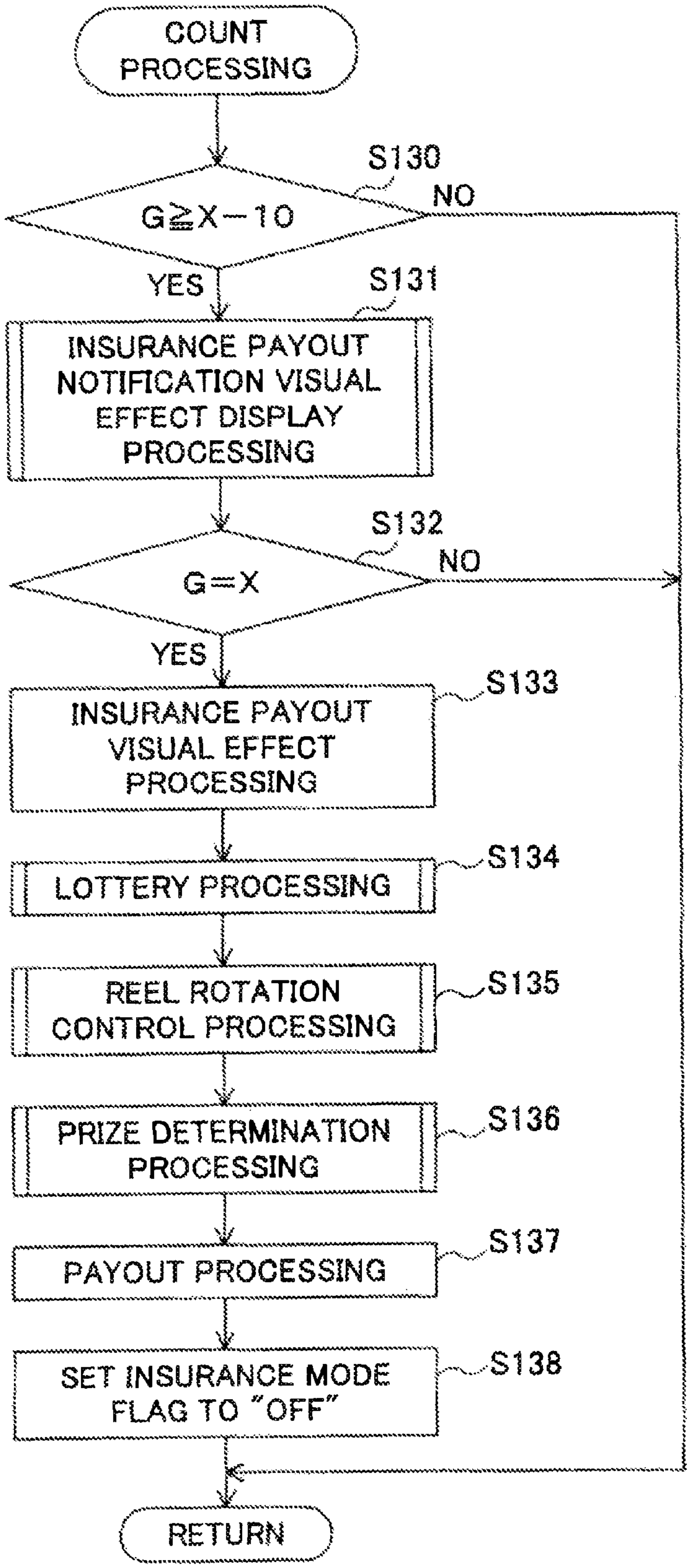
FIG. 12 is a flowchart illustrating a subroutine for count processing.

FIG. 12 is a flowchart illustrating a subroutine for count processing which is called in Step S18 of the subroutine shown in FIG. 9, thereby executing the count processing. In this flowchart, the number counted by the game counter is represented by G, and a number specified as the game count that causes the switch to the insurance mode is represented by X.

First, the main CPU 41 determines whether or not G is equal to or greater than (X−10) (Step S130). That is, the main CPU 41 determines whether or not ten games or less remain before the game count reaches the specified number (X), which causes the switch to the insurance mode. In a case where determination has been made that there are ten or less games remaining, insurance payout notification visual effect display processing is performed (Step S131). In this case, the switch to the cashback mode will occur soon. Accordingly, in the insurance payout notification visual effect display processing, the main CPU 41 performs visual effect display processing, which is described in detail with reference to FIG. 13, examples of which include processing in which the number of remaining games is displayed in a large size or the like (FIGS. 20 through 24).

Figure 25:
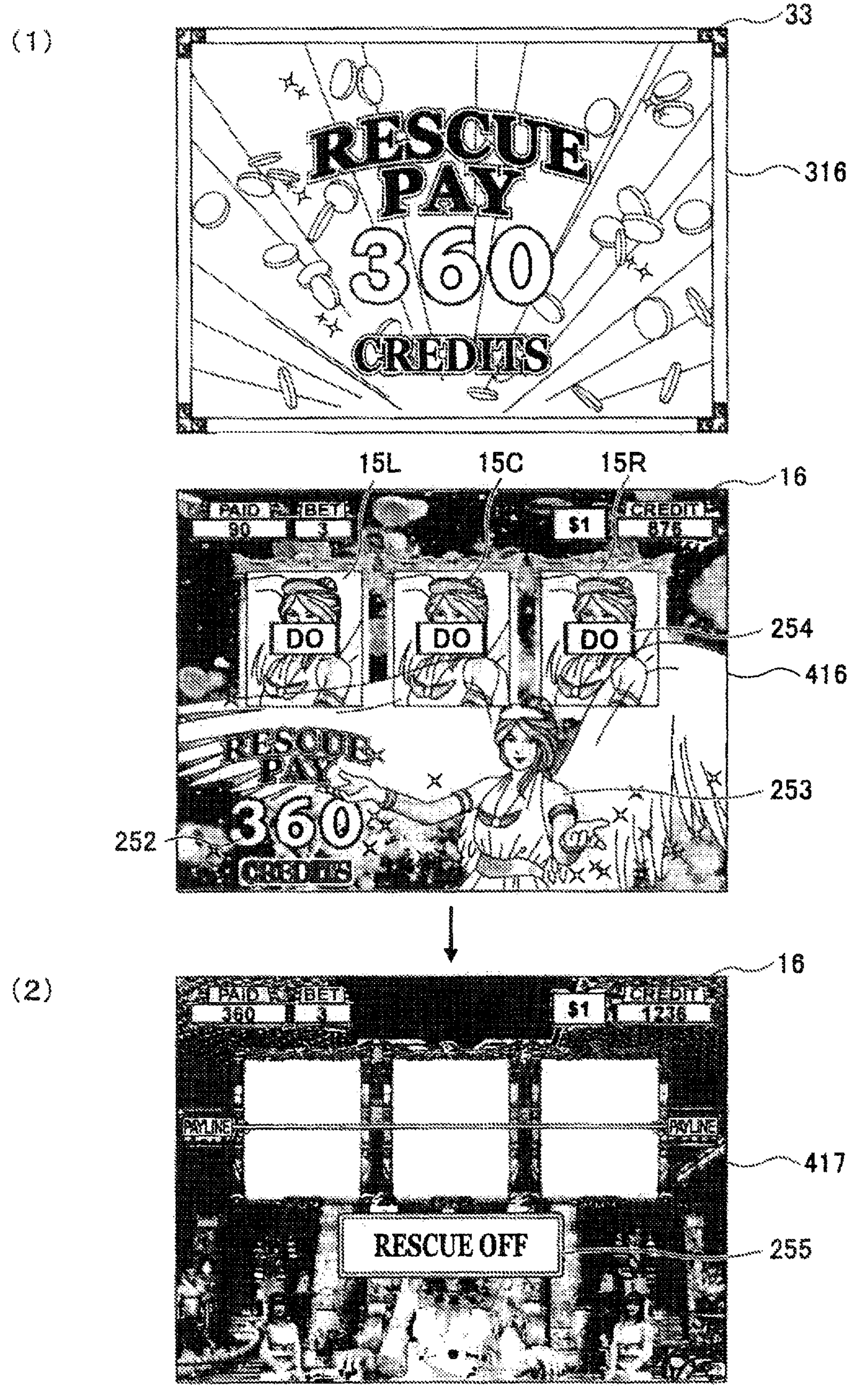
FIG. 25 is a diagram illustrating an example of images displayed on the upper image display panel and the lower image display panel at the time when the game mode is switched to the cashback mode.

Next, the main CPU 41 determines whether or not G is equal to X (Step S132). That is, the main CPU 41 determines whether or not the game counter (G) matches the specified number (X). In a case where determination has been made that G is equal to X, the game mode is switched to the cashback mode, and the insurance payout visual effect display processing is performed (Step S133). In this processing, images shown in FIG. 25 are displayed.

Next, the main CPU 41 performs lottery processing (Step S134). The main CPU 41 calls the lottery processing, which is described later in detail with reference to FIG. 14. In a case where the game mode has been switched to the cashback mode, the main CPU 41 performs the lottery, and determines the symbol combination to be rearranged.

Next, the main CPU 41 calls the reel rotation control processing, which is described in detail with reference to FIG. 16, and performs the reel rotation control processing, which provides a symbol combination according to the lottery results (Step S135). Next, the main CPU 41 calls the award determination processing, which has been described in detail with reference to FIGS. 10 and 11, and determines the award that corresponds to the symbol combination thus displayed after the reels stop rotating (Step S136).

Next, the main CPU 41 performs payout processing (Step S137). In this processing, the main CPU 41 performs the payout processing according to the award. At the same time, the main CPU 41 performs payout processing according to the cashback mode (360 credits for rescue payout in the present embodiment). Next, the main CPU 41 sets the insurance mode flag to the OFF state (Step S138). Subsequently, the main CPU 41 ends this subroutine.

Figure 13:
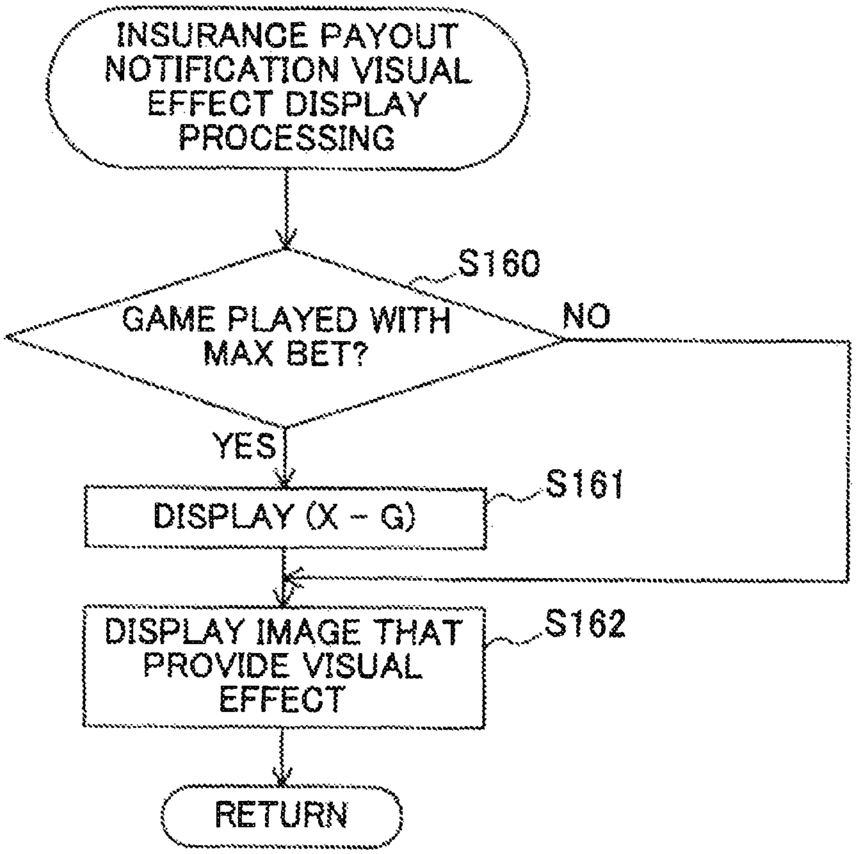
FIG. 13 is a flowchart illustrating a subroutine for insurance payout notice visual effect display processing.

FIG. 13 is a flowchart illustrating a subroutine for the insurance payout notification visual effect display processing, which is called in Step S131 of the subroutine shown in FIG. 12, thereby executing the insurance payout notification visual effect display processing.

First, the main CPU 41 determines whether or not the player has played the game with the MAX BET (Step S160). Specifically, the main CPU 41 determines whether or not determination has been made in Step S13, shown in FIG. 9, that the player has played the game with the MAX BET. In a case where determination has been made that the player has played the game with the MAX BET, the main CPU 41 displays the difference between the specified number and the game count, which is obtained by subtracting the count value of the game count (G) from the specified number (X) (Step S161).

After the execution of the processing in Step S161, or in a case where determination has been made in Step S160 that the player has not played the game with the MAX BET, the main CPU 41 displays images that provide visual effects (Step S162). In this processing, the value obtained by subtracting the count value of the game count from the specified number is ten or less. Accordingly, the main CPU 41 displays the remaining number of games (10 to 1) in a large size before the game mode is switched to the cashback mode (which provides the rescue payout in which a predetermined amount of credits are paid out). Furthermore, the main CPU 41 provides special visual effects, as shown in FIG. 20 to FIG. 24.

Figure 20:
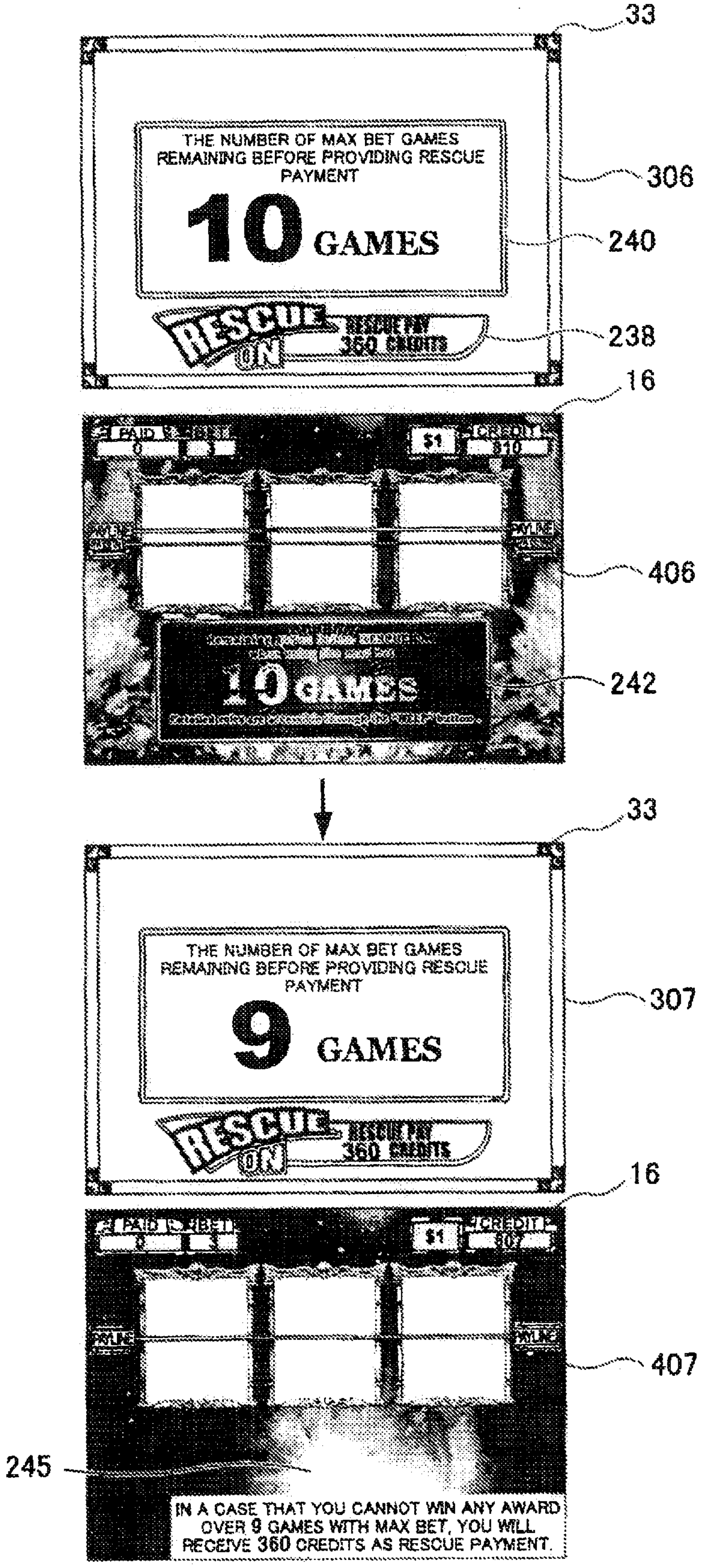
FIG. 20 is a diagram illustrating an example of images displayed on the upper image display panel and the lower image display panel in the insurance mode.

FIG. 20 is a diagram illustrating an example of images displayed on the upper image display panel and the lower image display panel in the insurance mode. FIG. 20(1) is a diagram illustrating an example of images (upper image 306 and lower image 406) displayed on the upper image display panel 33 and the lower image display panel 16 in the insurance mode. An image 240, showing an explanatory text "The number of MAX BET games remaining before providing rescue payment", and a notice "10 GAMES", is included in the central portion of the upper image 306. Furthermore, an image 238, showing a notice "RESCUE ON RESCUE PAY 360 CREDITS", which indicates that the game mode is in the RESCUE ON mode, is included in the upper image 306. On the other hand, an image 242, showing a notice "10 GAMES", which indicates that 10 games remain before the rescue payout is provided, is included in the lower image 406.

FIG. 20(2) is a diagram illustrating an image displayed in a stage in which the number of remaining games is nine, this number having been obtained by subtracting the number of remaining games by 1 after the unit game has been executed in the state shown in FIG. 20(1), and the game count has been added. The images shown in this drawing are an example of images (upper image 307 and lower image 407) displayed on the upper image display panel 33 and the lower image display panel 16. Each of the upper image 307 and the lower image 407 displays the number of remaining games, i.e., 9. Furthermore, a point of illumination 245 is displayed in the lower portion of the lower image 407. The point of illumination 245 serves as a hint that visual effects are about to start before the rescue payout is awarded. Such visual effects provide the player with a feeling that there are only a few games remaining before the rescue payout is awarded.

Figure 21:
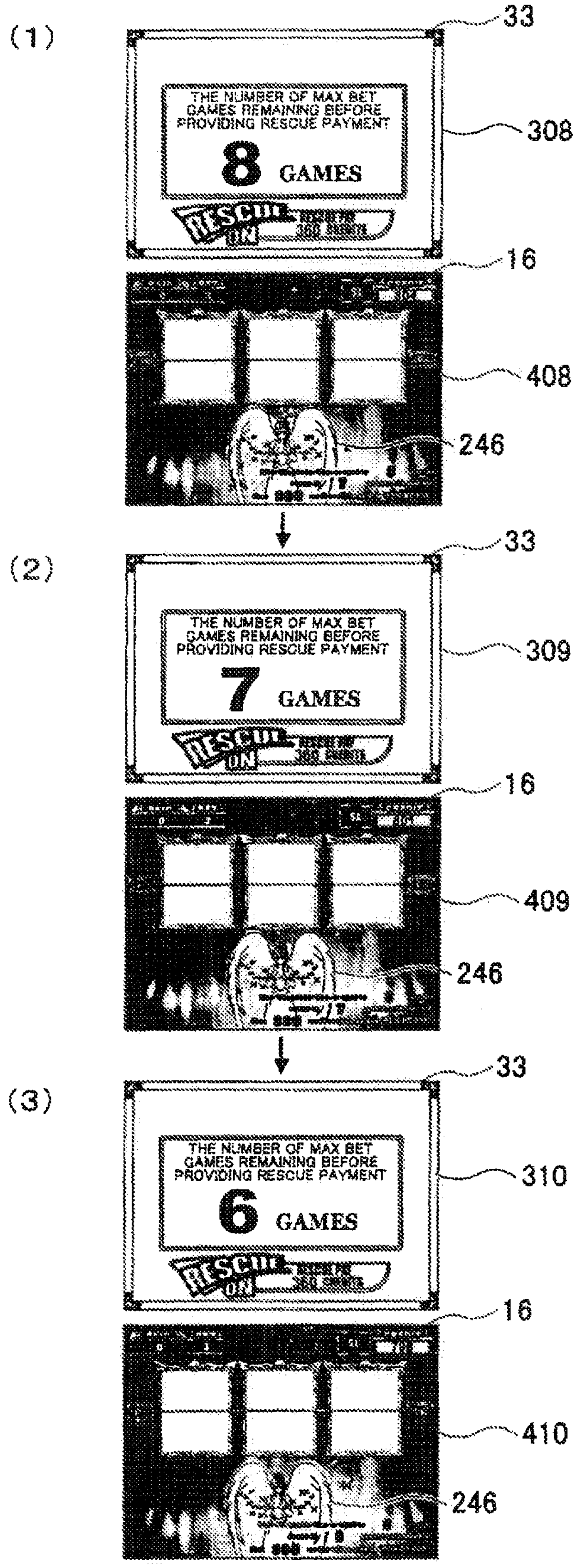
FIG. 21 is a diagram illustrating an example of images displayed on the upper image display panel and the lower image display panel in the insurance mode.

FIG. 21 is a diagram illustrating an example of images displayed on the upper image display panel and the lower image display panel in the insurance mode. FIG. 21(1) is a diagram illustrating an image displayed in a stage in which the number of remaining games is eight, this number having been obtained by subtracting the number of remaining games by 1 after the unit game has been further executed in the state shown in FIG. 20(2), and the game count has been further added. The images shown in this drawing are an example of images (upper image 308 and lower image 408) displayed on the upper image display panel 33 and the lower image display panel 16. Each of the upper image 308 and the lower image 408 displays the number of remaining games, i.e., 8. An angel 246 is displayed in a lower portion of the lower image 408, gradually spreading her wings, which is a visual effect that notifies the player that the rescue payout will be awarded soon. Such visual effects provide the player with a feeling that the rescue payout will be awarded sooner.

FIG. 21(2) is a diagram illustrating an image displayed in a stage in which the number of remaining games is seven, this number having been obtained by subtracting the number of remaining games by 1 after the unit game has been further executed in the state shown in FIG. 21(1), and the game count has been further added. The images shown in this drawing are an example of images (upper image 309 and lower image 409) displayed on the upper image display panel 33 and the lower image display panel 16. Each of the upper image 309 and the lower image 409 displays the number of remaining games, i.e., 7. The angel 246 is displayed in a lower portion of the lower image 409, gradually spreading her wings, which is a visual effect that notifies the player that the rescue payout will be awarded soon. Such visual effects provide the player with a feeling that the rescue payout will be awarded sooner.

FIG. 21(3) is a diagram illustrating an image displayed in a stage in which the number of remaining games is six, this number having been obtained by subtracting the number of remaining games by 1 after the unit game has been further executed in the state shown in FIG. 21(2), and the game count has been further added. The images shown in this drawing are an example of images (upper image 310 and lower image 410) displayed on the upper image display panel 33 and the lower image display panel 16. Each of the upper image 310 and the lower image 410 displays the number of remaining games, i.e., 6. The angel 246 is displayed in a lower portion of the lower image 410, gradually spreading her wings, which is a visual effect that notifies the player that the rescue payout will be awarded soon. Such visual effects provide the player with a feeling that the rescue payout will be awarded sooner.

Figure 22:
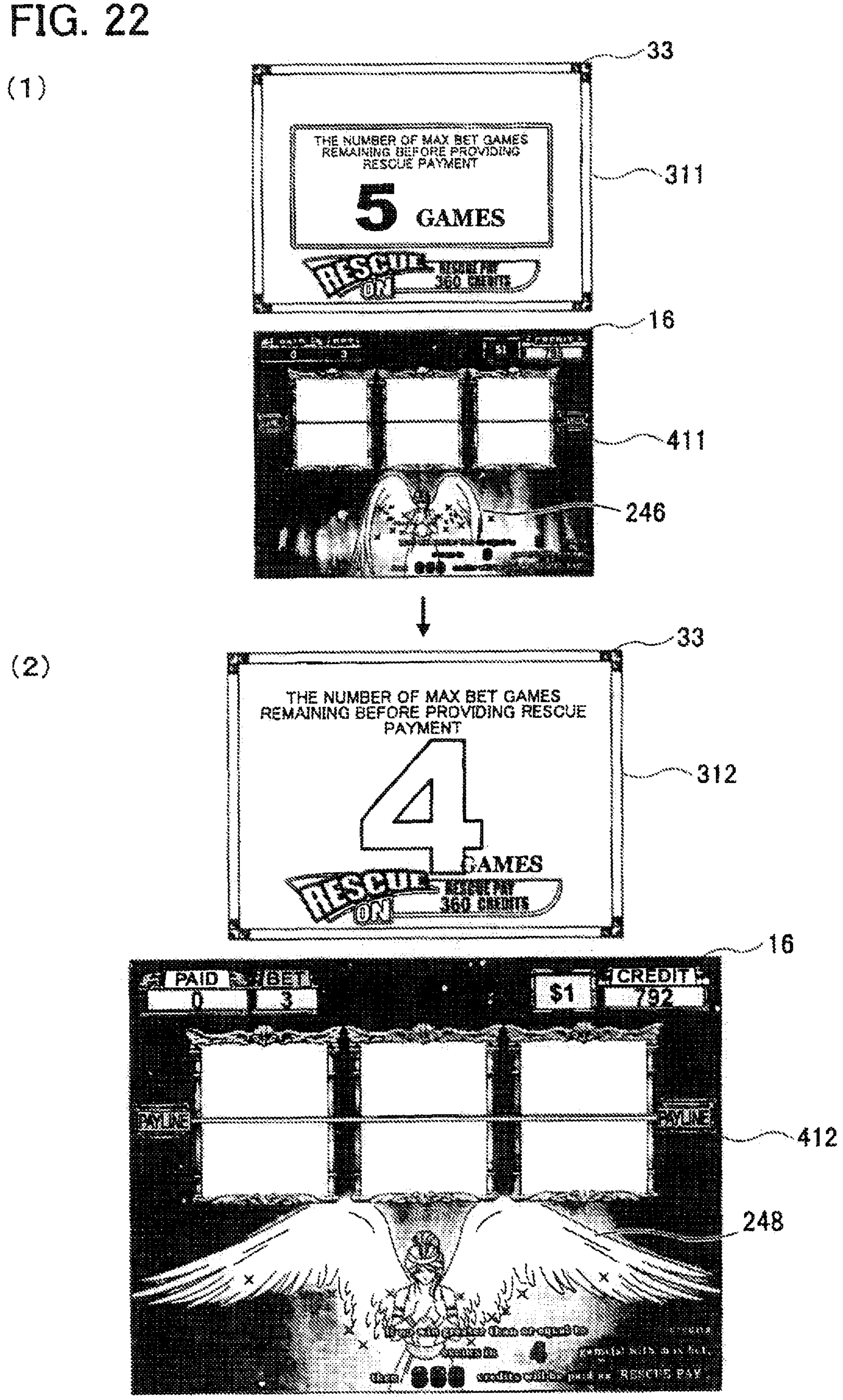
FIG. 22 is a diagram illustrating an example of images displayed on the upper image display panel and the lower image display panel in the insurance mode.

FIG. 22 is a diagram illustrating an example of images displayed on the upper image display panel and the lower image display panel in the insurance mode. FIG. 22(1) is a diagram illustrating an image displayed in a stage in which the number of remaining games is five, this number having been obtained by subtracting the number of remaining games by 1 after the unit game has been further executed in the state shown in FIG. 21(3), and the game count has been further added. The images shown in this drawing are an example of images (upper image 311 and lower image 411) displayed on the upper image display panel 33 and the lower image display panel 16. Each of the upper image 311 and the lower image 411 displays the number of remaining games, i.e., 5. The angel 246 is displayed in a lower portion of the lower image 411, gradually spreading her wings, which is a visual effect that notifies the player that the rescue payout will be awarded soon. Such visual effects provide the player with a feeling that the rescue payout will be awarded sooner.

FIG. 22(2) is a diagram illustrating an image displayed in a stage in which the number of remaining games is four, this number having been obtained by subtracting the number of remaining games by 1 after the unit game has been further executed in the state shown in FIG. 22(1), and the game count has been further added. The images shown in this drawing are an example of images (upper image 312 and lower image 412) displayed on the upper image display panel 33 and the lower image display panel 16. Each of the upper image 312 and the lower image 412 displays the number of remaining games, i.e., 4. The angel 248 is displayed in a lower portion of the lower image 412, spreading her wings widely, which is a visual effect that notifies the player that the rescue payout will be awarded soon. Such visual effects provide the player with a feeling that the rescue payout will be awarded sooner.

Figure 23:
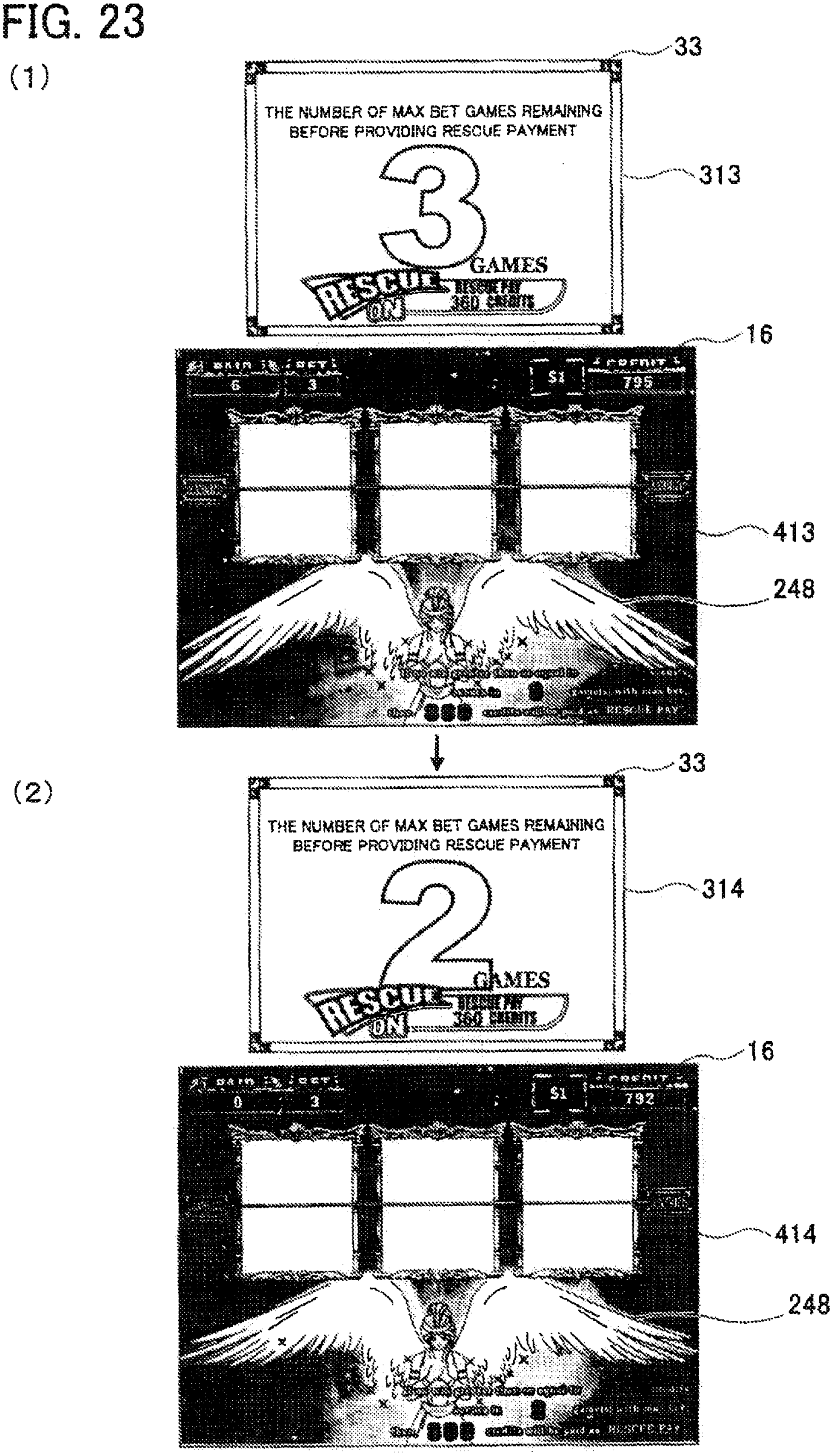
FIG. 23 is a diagram illustrating an example of images displayed on the upper image display panel and the lower image display panel in the insurance mode.

FIG. 23 is a diagram illustrating an example of images displayed on the upper image display panel and the lower image display panel in the insurance mode. FIG. 23(1) is a diagram illustrating an image displayed in a stage in which the number of remaining games is three, this number having been obtained by subtracting the number of remaining games by 1 after the unit game has been further executed in the state shown in FIG. 22(2), and the game count has been further added. The images shown in this drawing are an example of images (upper image 313 and lower image 413) displayed on the upper image display panel 33 and the lower image display panel 16. Each of the upper image 313 and the lower image 413 displays the number of remaining games, i.e., 3. The angel 248 is displayed in a lower portion of the lower image 413, spreading her wings widely, which is a visual effect that notifies the player that the rescue payout will be awarded soon. Such visual effects provide the player with a feeling that the rescue payout will be awarded sooner.

FIG. 23(2) is a diagram illustrating an image displayed in a stage in which the number of remaining games is two, this number having been obtained by subtracting the number of remaining games by 1 after the unit game has been further executed in the state shown in FIG. 23(1), and the game count has been further added. The images shown in this drawing are an example of images (upper image 314 and lower image 414) displayed on the upper image display panel 33 and the lower image display panel 16. Each of the upper image 314 and the lower image 414 displays the number of remaining games, i.e., 2. The angel 248 is displayed in a lower portion of the lower image 412, spreading her wings widely, which is a visual effect that notifies the player that the rescue payout will be awarded soon. Such visual effects provide the player with a feeling that the rescue payout will be awarded sooner.

Figure 24:
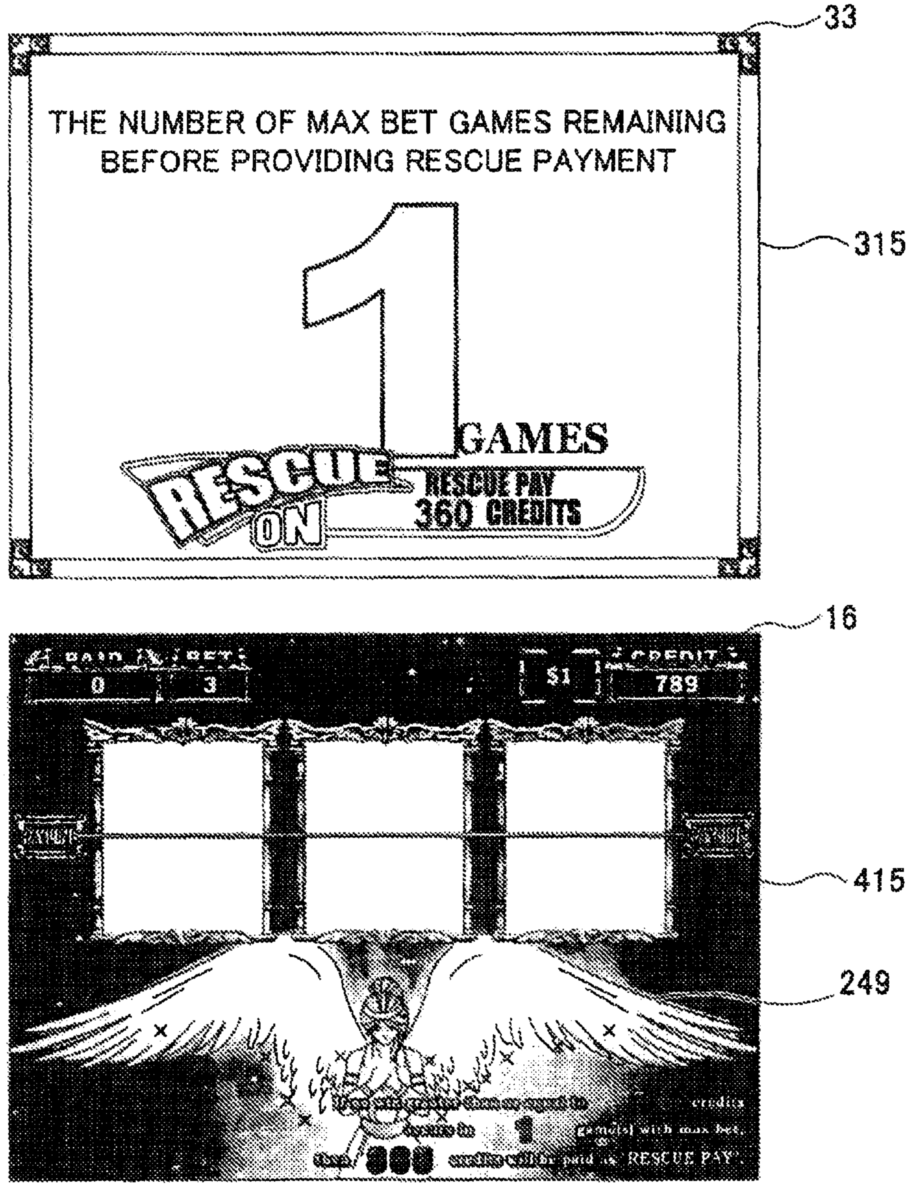
FIG. 24 is a diagram illustrating an example of images displayed on the upper image display panel and the lower image display panel in the insurance mode.

FIG. 24 is a diagram illustrating an example of images displayed on the upper image display panel and the lower image display panel in the insurance mode. Specifically, FIG. 24 shows an image displayed in a stage in which the number of remaining games is one, this number having been obtained by subtracting the number of remaining games by 1 after the unit game has been further executed in the state shown in FIG. 23(2), and the game count has been further added. The images shown in this drawing are an example of images (upper image 315 and lower image 415) displayed on the upper image display panel 33 and the lower image display panel 16. Each of the upper image 315 and the lower image 415 displays the number of remaining games, i.e., 1. An angel 249 is displayed in a lower portion of the lower image 415, spreading her wings even more widely, which is a visual effect that notifies the player that the rescue payout is just about to be awarded. Such visual effects provide the player with a feeling that the rescue payout is just about to be awarded.

FIG. 25 is a diagram illustrating an example of images displayed on the upper image display panel and the lower image display panel when the game mode switches to the cashback mode. FIG. 25(1) is a diagram illustrating an image displayed in the cashback mode in which the number of remaining games is zero, this number having been obtained by subtracting the number of remaining games by 1 after the unit game has been further executed in the state shown in FIG. 24, and the game count has been further added. The images shown in this drawing are an example of images (upper image 316 and lower image 416) displayed on the upper image display panel 33 and the lower image display panel 16. The upper image 316 shows that the player will receive a rescue payout in the form of 360 credits. On the other hand, the lower image 416 shows that the player now has 876 (786+90) credits as a result of a payout of 90 credits due to the "DO" symbol combination (image 254), which corresponds to a award, having been rearranged in the display windows 15L, 15C, and 15R in the game in the cashback mode. Furthermore, the lower image 416 displays an angel image 253, which offers the player to receive the rescue payout.

FIG. 25(2) is a diagram illustrating an example of an image (lower image 417) displayed on the lower image display panel 16 after the cashback mode ends. The lower image 417 displays the credit amount "1236" (876+360) as a result of a payout of 360 credits according to the rescue payout, and displays an image 255 that shows "RESCUE OFF", which indicates that the cashback mode has ended.

FIG. 14 is a flowchart illustrating a subroutine for lottery processing called in Step S15 of the subroutine shown in FIG. 9, by which the lottery processing is executed. The main CPU 41 executes a lottery program stored in the RAM 43, thereby executing the lottery processing. First, the main CPU 41 selects a random number in a range of values from 0 to 255 for each of the three reels 14 by executing a random number generating program stored in the lottery program (Step S31). A description is provided in the present embodiment regarding an arrangement in which each random number is generated by a program (i.e., an arrangement in which a so-called software random number generator is used). In addition, an arrangement may be made of the present invention in which a random number generator is provided, and each random number is extracted from the random number generator (i.e., a so-called hardware random number generator is used).

Next, the main CPU 41 (computation processing device) determines the code number (see FIG. 2) for each reel 14 based upon the three random numbers thus selected with reference to the symbol weighting data corresponding to the payout ratio setting data, which has been output from the GAL 54 and stored in the RAM 43 (storage device) (Step S32). The code number selected for each reel 14 corresponds to the symbol code number of the symbol which is to be rearranged along the pay line. The main CPU 41 determines the code number for each reel 14, thereby determining an award. For example, let us consider a case in which the main CPU 41 determines that the code numbers for the reels 14 are "00", "00", and "00". This determination indicates that the CPU 41 has determined that the player wins the "DO" award. It should be noted that the reel rotation control processing is performed according to the reel code numbers thus determined, as described later.

Next, a description is provided regarding the award according to the present embodiment. FIG. 15 is a diagram illustrating multiple kinds of awards and the relation for each award between the probability that a player will win the award and the payout amount. FIG. 15 illustrates an example of the aforementioned relations with a payout ratio of 88% (excluding the bonus game). It should be noted that the probability that the player will win the award shown in the drawing represents the probability that the player will win the award after the code numbers of the reels 14 have been determined based upon the three random numbers with reference to the symbol weighting data. That is, the aforementioned random numbers are not associated with the award.

In this example, the probability that the player will win the bonus game trigger is 0.5%. In a case where the player has won the bonus game trigger, the three "APPLE" symbols are rearranged along the pay line, upon which the player wins the bonus game. In the bonus game stage, a free game is executed a predetermined number of times, as determined by lottery.

On the other hand, the probability that the player will win the "DO" award is 0.5%. In a case where the player has won the "DO" award, the three "DO" symbols are rearranged along the pay line, upon which the player wins 30 coins per coin bet. The lower the probability that the player will win the award is, the greater the amount of credit to be paid out according to the award is. It should be noted that, in a case where the symbol combination as rearranged does not match any one of the symbol combinations corresponding to the awards shown in FIG. 15, the player loses the game, and accordingly, the player does not receive any coins.

Figure 16:
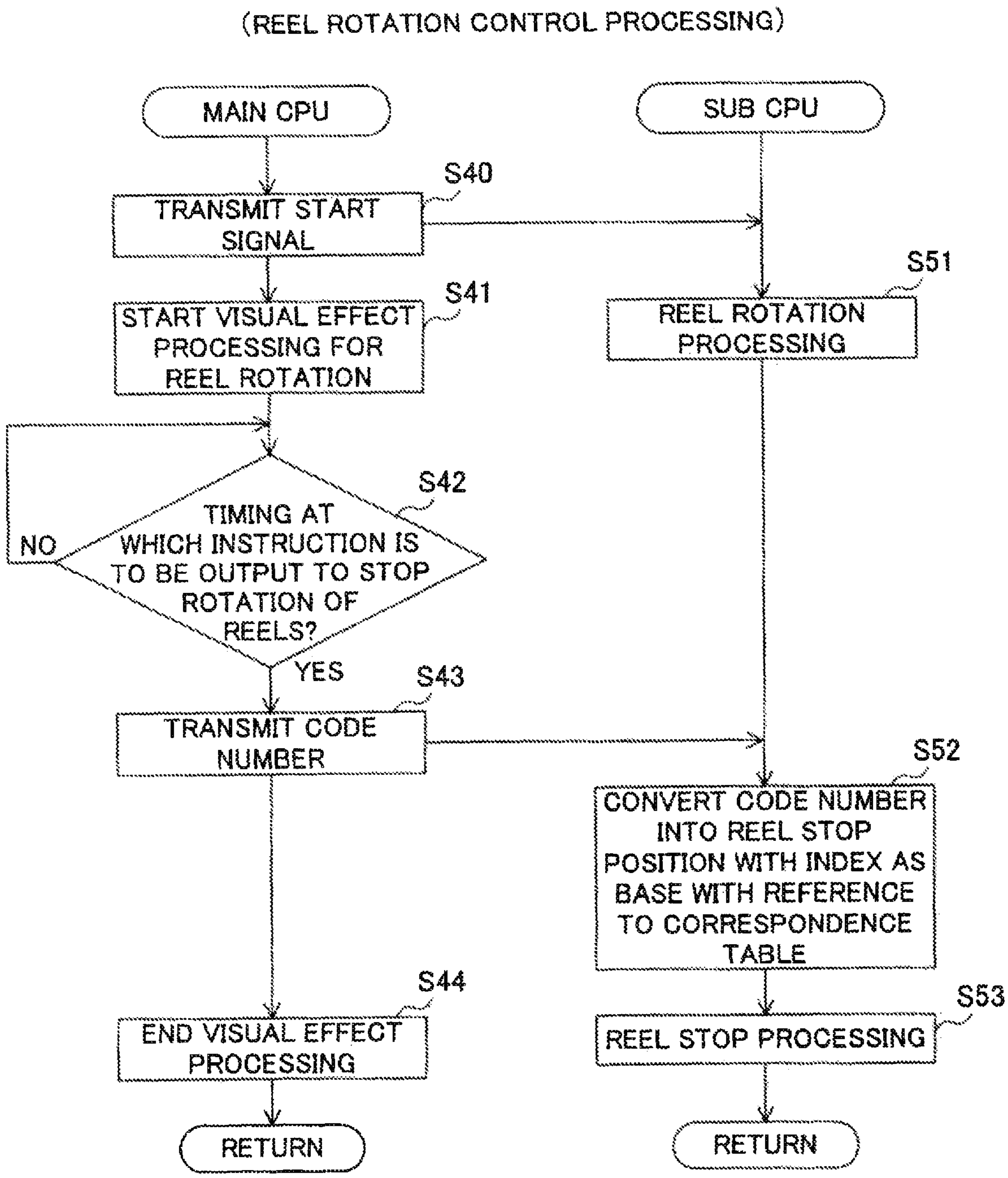
FIG. 16 is a flowchart illustrating a subroutine for reel rotation control processing.
Figure 17A:
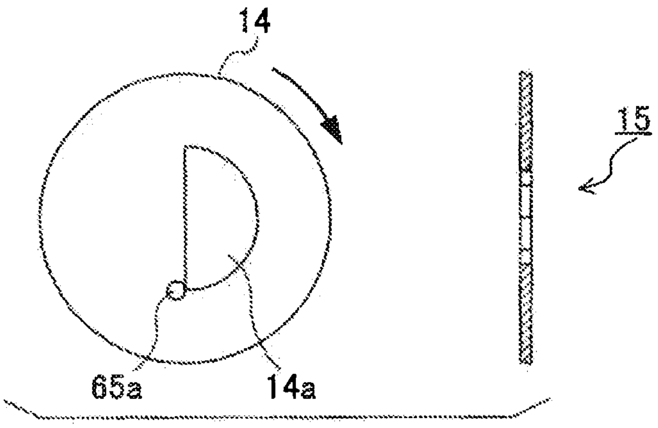
FIGS. 17(*a*) through 17(*d*) are side views illustrating the rotation operation of the reel.
Figure 17B:
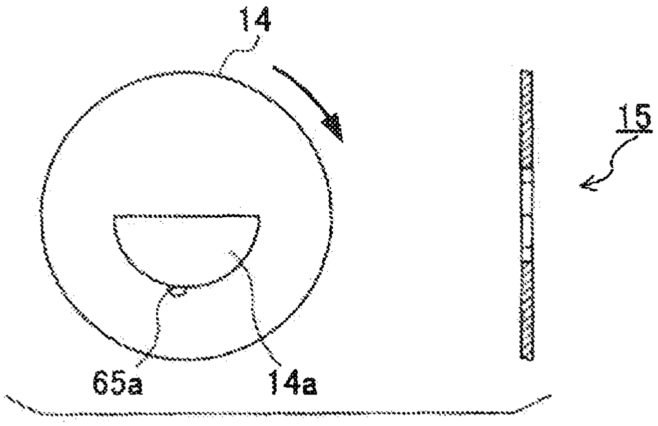
Figure 17C:
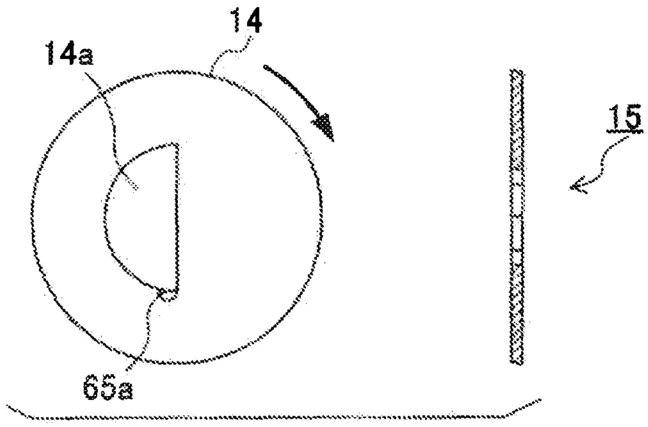
Figure 17D:
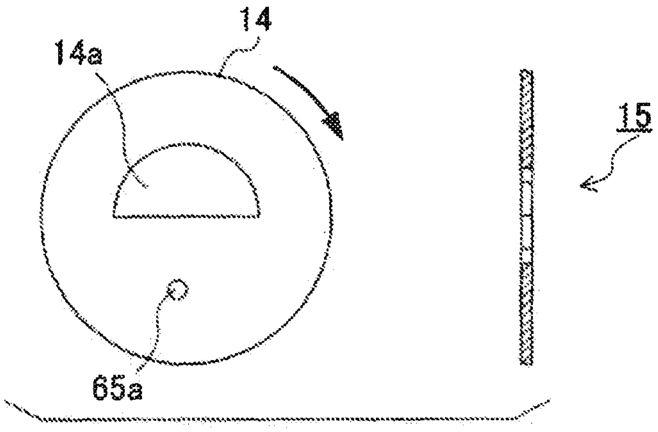

FIG. 16 is a flowchart illustrating a subroutine for the reel rotation control processing which is called in Step S16 of the subroutine shown in FIG. 9, by which the reel rotation control processing is executed. It should be noted that the main CPU 41 and the sub CPU 61 perform this processing in cooperation with each other.

First, the main CPU 41 transmits a start signal to the sub CPU 61, which is an instruction to start to rotate the reels (Step S40). Upon reception of the start signal from the main CPU 41, the sub CPU 61 performs reel rotation processing (Step S51). In this processing, the sub CPU 61 sends pulses to the motor driving circuit 62. The pulses output from the sub CPU 61 are amplified by the driver 64, and are sent to the stepping motors 70 (70L, 70C, and 70R). As a result, each stepping motor 70 rotates, thereby rotating each reel 14 (14L, 14C, and 14R). The single- or two-phase stepping motor provides rotation with a stepping angle of 0.9°. With such an arrangement, one rotation corresponds to 400 steps. Accordingly, upon 400 pulses being sent to the stepping motor 70, the corresponding reel 14 makes one revolution.

At the time that the reels 14 start to rotate, the sub CPU 61 sends the pulses to the motor driving circuit 62 at a low frequency. Subsequently, the sub CPU 61 increases the frequency of the pulses. The rotation speed of each reel 14 increases according to the increase in the frequency of the pulses. After a predetermined period of time has elapsed, the sub CPU 61 maintains the pulse frequency at a constant value. As a result, each reel 14 rotates at a constant rotation speed.

Next, a description is provided regarding the rotation operation of the reels 14 with reference to FIG. 17. FIGS. 17(*a*) to 17(*d*) are side views illustrating the rotation operation of the reels 14. As shown in FIG. 17(*a*), a semicircular metal plate 14*a* is provided on the side face of each reel 14. The metal plate 14*a* rotates along with the reel 14. Furthermore, 22 symbols (see FIG. 2) are provided on the outer face of each reel 14. Such an arrangement allows the player to visually identify the three symbols, which have been selected from among the 22 symbols depicted on the outer face of each reel 14, through the corresponding display window 15 formed in front of the reel 14. In this drawing, each bold arrow indicates the direction of rotation of the reel 14. Furthermore, a proximity sensor 65*a* is provided on the side of each reel 14. The proximity sensor 65*a* is provided to detect the metal plate 14*a*. The proximity sensor 65*a* does not move or rotate, regardless of the rotation of the reels 14.

FIG. 17(*a*) shows the metal plate 14*a* at a position (also referred to as "position A" hereinafter) that corresponds to the beginning of the detection period in which the proximity sensor 65*a* detects the metal plate 14*a*. Upon rotation of the reel 14 from the state in which the metal plate 14*a* is positioned at the position A, the metal plate 14*a* moves to the position shown in FIG. 17(*b*). FIG. 17(*b*) shows the metal plate 14*a* at a position (also referred to as "position B" hereinafter) that corresponds to the detection period in which the proximity sensor 65*a* detects the metal plate 14*a*. Upon rotation of the reel 14 from the state in which the metal plate 14*a* is positioned at the position B, the metal plate 14*a* moves to the position shown in FIG. 17(*c*). FIG. 17(*c*) shows the metal plate 14*a* at a position (also referred to as "position C" hereinafter) that corresponds to the beginning of the period of time in which the proximity sensor 65*a* does not detect the metal plate 14*a*.

Upon rotation of the reel 14 from the state in which the metal plate 14*a* is positioned at the position C, the metal plate 14*a* moves to the position shown in FIG. 17(*d*). FIG. 17(*d*) shows the metal plate 14*a* at a position (also referred to as "position D" hereinafter) that corresponds to a period in time in which the proximity sensor 65*a* does not detect the metal plate 14*a*. Upon further rotating the reel 14, the position of the metal plate 14*a* is returned to the position A. As described above, the position of the metal plate 14*a* changes in the following order: position A, position B, position C, position D, position A, and so on.

The proximity sensor 65*a* is a component of the index detection circuit 65 (see FIG. 3). Next, the state in which the proximity sensor 65*a* detects the metal plate 14*a* is referred to as the "HIGH state". On the other hand, the state in which the proximity sensor 65*a* does not detect the metal plate 14*a* is referred to as the "LOW state". When the metal plate 14*a* moves through the range of positions from position A to position B to position C, the index detection circuit 65 state is HIGH. On the other hand, when the metal plate moves through the range of positions from position C to position D to position A, the index detection circuit 65 state is LOW. Note that the sub CPU 61 detects the point of rising from the LOW state to the HIGH state as the index (origin) 1. On the other hand, the sub CPU 61 detects the point of falling from the HIGH state to the LOW state as the index (origin) 2. Thus, the sub CPU 61 detects the rotational position of each reel 14.

The main CPU 41 transmits a start signal to the sub CPU 61 in Step S40, followed the main CPU 41 providing visual effects for the rotation of the reels (Step S41). The main CPU 41 performs such visual effect processing during a period of time (e.g., three seconds) determined based upon the results of the lottery processing (Step S15 in FIG. 9), examples of which include: image display processing in which images are displayed on the lower image display panel 16; audio processing in which sound is output from the speaker 29; etc.

Next, the main CPU 41 determines whether or not the current timing is the timing at which the reels 14 are instructed to stop rotating (Step S42). Here, the main CPU 41 instructs the reels 14 to stop rotating, at a time before the end of the visual effects provided in the reel rotation step, with the aforementioned time corresponding to a predetermined period of time that is necessary for the reels 14 to stop rotating. It should be noted that the period of time necessary for the reels 14 to stop rotating is determined beforehand.

In a case where determination has been made in Step S42 that the current timing is not the timing designated for the main CPU 41 to instruct the reels 14 to stop rotating, the flow returns to Step S42, and the main CPU 42 continues to provide visual effects for the reel rotation step. On the other hand, in a case where determination has been made in Step S42 that the current timing is the timing designated for the main CPU 41 to instruct the reels 14 to stop rotating, the main CPU 41 transmits to the sub CPU 61 the code number stored in the RAM 43 for each reel (Step S43). Upon reception of the code number from the main CPU 41, the sub CPU 61 converts the code number into the stop position (steps) of the corresponding reel with the index as the base, based upon the correspondence table, which is stored in ROM (not shown) and indicates the correspondence between the steps and the code number (Step S52), provided to the sub CPU 61.

FIG. 18 is a schematic diagram illustrating the correspondence between the steps and the code number. Each code number is associated with a corresponding index and corresponding steps. It should be noted that each code number corresponds to any one of the symbols depicted on the outer face of each reel 14 (see FIG. 2). The symbol that corresponds to any one from among the range of code numbers "00" to "10", corresponds to the index 1. On the other hand, the symbol that corresponds to any one from among the range of code numbers "11" to "21", corresponds to the index 2. Here, the steps shown in the correspondence table in FIG. 18 are defined with the index 1 as the base. For example, let us consider a case in which the code number is "08". In this case, the reel stops rotating after the reel has rotated 145 steps from the index 1. On the other hand, let us consider a case in which the code number is "12". In this case, the reel stops rotating after the reel has rotated 218 steps from the index 1.

Next, the sub CPU 61 executes the reel stop processing (Step S53). In this processing, the sub CPU 61 instructs the index detection circuit 65 to detect the point of rising (index 1) from the LOW state to the HIGH state for each reel 14. Then, at the timing at which the index 1 is detected, the sub CPU 61 sends to the motor driving circuit 62 the number of pulses that corresponds to the number of steps thus converted from the code number in Step S52. Subsequently, the sub CPU 61 stops sending pulses.

For example, let us consider a case in which determination has been made in Step S52 that the reel should stop rotating at a reel stop position that is a distance 145 steps from the index 1. In this case, at the timing at which the index 1 is detected, the sub CPU 61 sends 145 pulses to the motor driving circuit 62, followed by the sub CPU 61 stopping sending pulses. On the other hand, let us consider a case in which determination has been made in Step S52 that the reel should stop rotating at a reel stop position that is at a distance 218 steps from the index 1. In this case, at the timing at which the index 1 is detected, the sub CPU 61 sends 218 pulses to the motor driving circuit 62. As a result, each reel 14 stops rotating according to the code number determined in Step S32 shown in FIG. 14, thereby rearranging the symbol combination along the pay line so as to correspond to the award determined in Step S32, shown in FIG. 14. On the other hand, the main CPU 41 ends the visual effects for the reel rotation step. After the completion of the processing in Steps S44 and S53, this processing ends.

Furthermore, let us consider a case in which the index that corresponds to the code number thus transmitted in Step S43 does not match the index thus detected by the index detection circuit 65 when the reels 14 are stationary. In this case, the reels 14 have deviated from their regular positions. Accordingly, the main CPU 41 performs processing such as display processing in which an error message is displayed on the lower image display panel 16, followed by the game being suspended. For example, let us consider a case in which the index detection circuit 56 has detected the index 1 after the reel 14L has stopped rotation, although the processing has been performed so that the reel 14L should stop rotation at a position that corresponds to the index 2 according to the code number 12. In such a case, the game is suspended.

Figure 19:
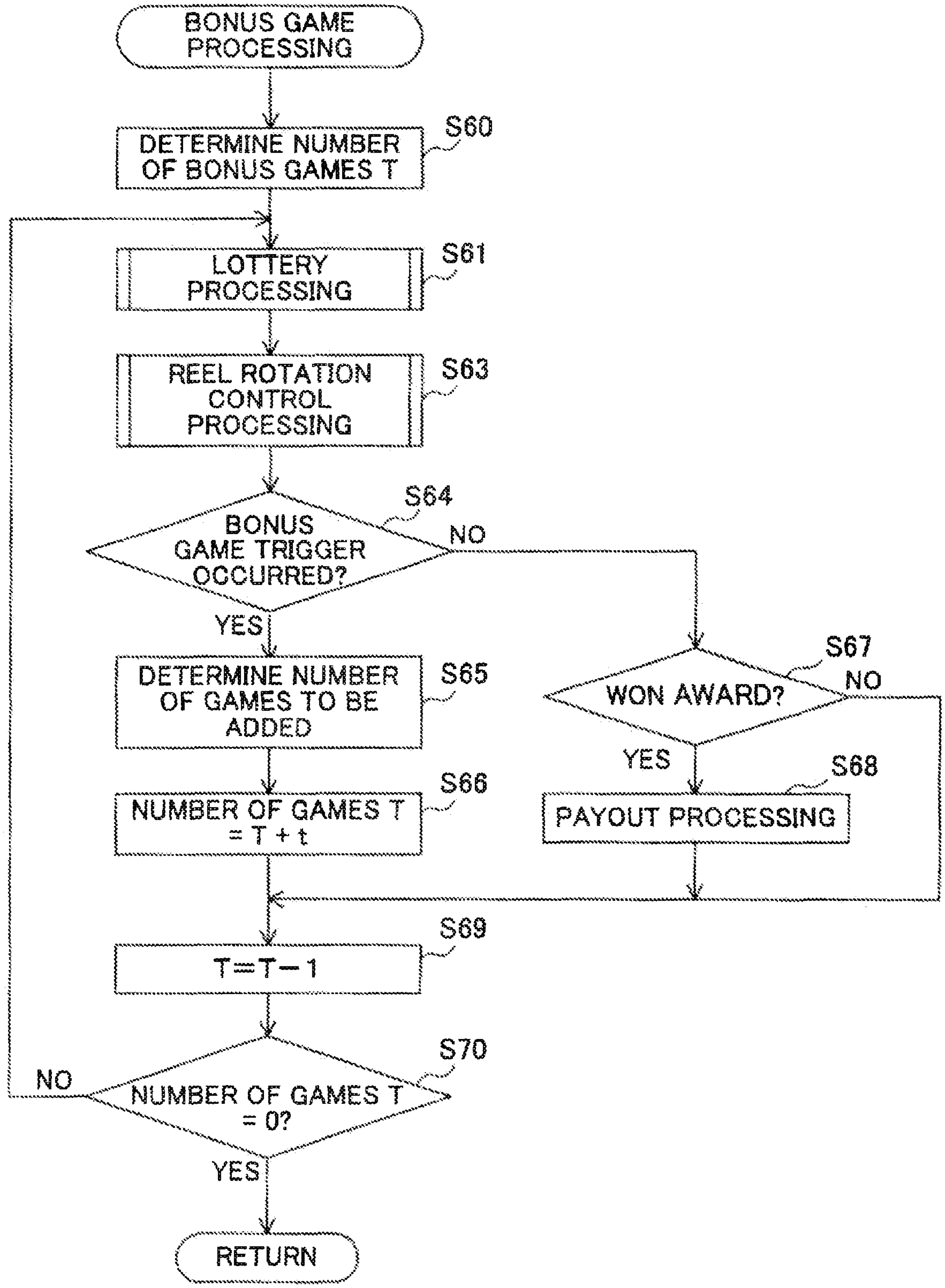
FIG. 19 is a flowchart illustrating a subroutine for bonus game processing.

FIG. 19 is a flowchart illustrating a subroutine for bonus game processing, which is called in Step S122 or Step S151 of the subroutine shown in FIG. 10 or FIG. 11, thereby executing the bonus game processing. In the bonus game processing, the main CPU 41 first executes the random number generating program included in the lottery program stored in the RAM 43 so as to obtain a random number. Then, the main CPU 41 determines the number of bonus games, from within a range of 10 to 25, based upon the random number thus obtained (Step S60). The main CPU 41 stores the number of bonus games thus determined in the RAM 43.

Subsequently, the main CPU 41 performs the lottery processing (Step S61) and the reel rotation control processing (Step S63). The processing in Step S61 is approximately the same as that described with reference to FIG. 14. In addition, the processing in Step S63 is approximately the same as that described with reference to FIG. 16. These processing steps have been described above, and therefore, no description thereof follows hereafter.

Next, the main CPU 41 determines whether or not the bonus game trigger has occurred, i.e., whether or not the "APPLE" symbol combination has been rearranged in the display windows 15 (Step S64). In a case where determination has been made that the bonus trigger has occurred, the repetition number t, according to which the bonus game is to be repeatedly provided, is newly determined by lottery (Step S65). The repetition number t thus determined is added to the number of currently remaining bonus games T (Step S66). With such an arrangement, in a case where the player has won another bonus game award in a bonus game, the number of remaining bonus games is added to. Specifically, let us consider a case in which the game stage switches to a first bonus game stage that provides 20 bonus games. Furthermore, let us suppose that in the twelfth of these bonus games, the player wins another bonus game award that provides 17 bonus games. In this case, the player wins 25 (=20−12+17) bonus games following the twelfth bonus game.

In a case where the bonus game trigger has not occurred, the main CPU 41 determines whether or not the player has won any award (Step S67). In a case where determination has been made that the player has won any award, the main CPU 41 pays out coins according to the coins bet and the award (Step S68).

After the execution of the processing in Step S66 or S68, or in a case where determination has been made in Step S67 that the player has not won any award (i.e., in a case that the player has lost the game), the main CPU 41 reads out the number of remaining bonus games T stored in the RAM 43, and subtracts by 1 the number of remaining bonus games T thus read out. Then, the main CPU 41 again stores in the RAM 43 the number of remaining bonus games T thus subtracted (Step S69).

Next, the main CPU 41 determines whether or not the number of remaining bonus games T has reached the number determined in Step S60 (S70). Specifically, this determination is made by determining whether or not the number of remaining bonus games T stored in the RAM 43 is zero. When the number of remaining bonus games is not zero, i.e., in a case where determination has been made that the number of bonus games executed has not reached the number determined in Step S60, the flow returns to Step S61, and the aforementioned processing is repeated. On the other hand, in a case that determination has been made that the number of remaining bonus games T is zero, i.e., in a case that determination has been made that the number of bonus games executed has reached the number determined in Step S60, the main CPU 41 ends this subroutine.

Figures 26, 27:
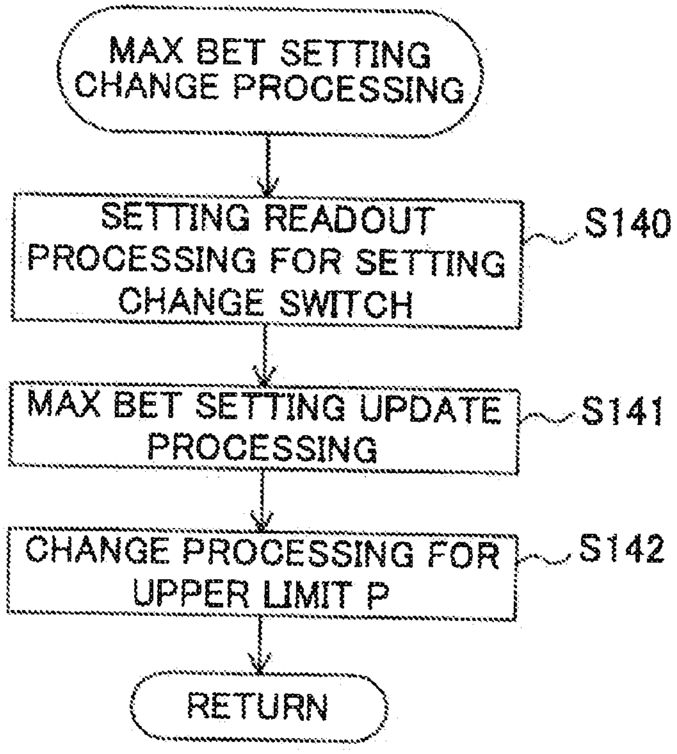
FIG. 26 is a flowchart illustrating a subroutine for MAX BET setting change processing.
FIG. 27 is a diagram illustrating a table that indicates the relation between the set value of the MAX BET and the payout amount that corresponds to the MAX BET thus set.

FIG. 26 is a flowchart illustrating a subroutine for the MAX BET setting change processing. This processing allows the settings to be changed with respect to the value which is to be bet on the game as the MAX BET. FIG. 27 is a diagram illustrating a table which indicates the relation between the MAX BET set value and the payout amount that corresponds to the MAX BET thus set. This table is used in the setting change processing, which allows the settings to be changed with respect to the value that is to be bet on the game as the MAX BET. In this table, the value which is to be bet on the game as the MAX BET is associated with the upper limit value (P) of the payout amount, which is to be provided in the insurance mode.

In the first processing, the main CPU 41 reads out the settings of a setting change switch 85 (Step S140). Here, the setting change switch 85 is an input device that allows the MAX BET value to be changed. Specifically, the setting change switch 85 allows the manager of the gaming machine 10 to change the settings at a predetermined timing, e.g., at the time when the power supply is turned on. In the next processing, the main CPU 41 updates the settings with respect to the MAX BET (Step S141). In the next processing, the main CPU 41 changes the upper limit value (P) of the payout amount that is to be provided in the insurance mode (Step S142). In this processing, the main CPU 41 acquires the upper limit value (P) corresponding to the value of the setting change switch with reference to the table (FIG. 27), and stores the upper limit value (P) thus acquired as the upper limit corresponding to the value that is to be bet on the game as the MAX BET. With such an arrangement, in a case where the credit amount paid out in the insurance mode is greater than the upper limit value, the number of games or the insurance mode is reset (see FIG. 11). Let us consider a case in which the upper limit value is set to a higher value. Specifically, let us consider a case in which the value that is to be bet on the game as the MAX BET is set to 50, which sets the upper limit to 3000. In this case, the upper limit is set to a higher value. Accordingly, it would be unusual for the number of games or the insurance mode to be reset, even if the player won any award in the insurance mode. After the completion of the processing in Step S142, the main CPU 41 ends this subroutine.

A description has been provided in the present embodiment regarding an arrangement in which the number of games is counted every time the player plays the game with the MAX BET in the insurance mode. With such an arrangement, when the number of games reaches a predetermined number, the game mode is switched to the cashback mode (see FIG. 9). Note that the present invention is not restricted to such an arrangement. In addition, an arrangement may be made in which the number of games is counted every game, regardless of whether or not the player plays the game with the MAX BET. With such an arrangement, when the number of games reaches a predetermined number, the game mode is switched to the cashback mode.

As described above, the gaming machine 10 according to the present embodiment includes the main CPU 41 (computation processing device), the RAM 43 (storage device), and the upper image display panel 33 and the lower image display panel 16. The gaming machine 10 having such a configuration provides: processing in which a lottery program stored in the RAM 43 is executed so as to select one award from among multiple kinds of awards determined beforehand (see FIG. 14); processing in which, in a case that a predetermined amount of credits have been inserted, a program for switching the game mode from the non-insurance mode to the insurance mode is read out from the RAM 43, and the program thus read out is executed (see FIG. 5); processing in which notification data and visual effects data, which are used to notify the player that the game mode has been switched to the insurance mode, are read out from the RAM 43, and images (see FIG. 20 etc.) are displayed on the upper image display panel 33 and the lower image display panel 16 based upon the notification data and the visual effects data (see FIG. 12 etc.); processing in which, after the game mode is switched to the insurance mode, the number of games is counted every time the game is executed with the MAX BET (see FIG. 9), and the difference between the number of games thus counted and a predetermined number (see FIG. 8 etc.) is displayed, and when the number of games thus counted reaches a predetermined number, a program for switching the game mode to the cashback mode is read out from the RAM 43, and the program thus read out is executed (see FIG. 12); processing in which the award won by the player is identified, and in a case where the award thus identified matches the bonus game award, the number of games thus counted or the insurance mode is reset (see FIG. 10); processing in which, in a case that the credit amount paid out according to the award is equal to or greater than a predetermined value, the number of games thus counted or the insurance mode is reset (see FIG. 11); and processing that allows the settings with respect to the MAX BET and the payout amount to be changed (see FIG. 26).

With the gaming machine 10, upon inserting a predetermined amount of credits, the game mode is switched from the non-insurance mode to the insurance mode. After the game mode is switched to the insurance mode, the number of games is counted and accumulated every time the player plays the game with the MAX BET. When the number of games thus counted reaches a predetermined number, the game mode is switched to the cashback mode. Such an arrangement allows the player to switch the game mode from the non-insurance mode to the insurance mode by inserting a predetermined amount of credits. The insurance mode provides the following advantages to the player. That is, when the number of games played by the player reaches a predetermined number, the game mode is switched to the cashback mode, which provides a award to the player and is compensation for a case in which the player has not won any bonus game award for a long period of time over which the player has spent a great number of coins. It should be noted that the player needs to insert a predetermined amount of credits for switching the game mode to the insurance mode. Furthermore, the number of games is counted only in a case where the player plays the game with the MAX BET. Such an arrangement provides fairness among the players who can receive awards in the games.

Furthermore, such an arrangement displays an image for informing the player that the game mode has been switched to the insurance mode (see FIG. 8). In addition, such an arrangement displays the difference between the number of games and the predetermined number. Thus, such an arrangement not only provides a function of notifying the player that the game mode has been switched to the insurance mode, but also a function of enhancing the player's interest in the cashback mode. Thus, such an arrangement prevents a situation in which players who have spent a great amount of coins come to feel distrust or displeasure with respect to the gaming machine, or a situation in which such players lose interest in the amusement service.

A description has been provided in the present embodiment regarding the gaming machine 10 which provides a function whereby, when the number of games reaches a predetermined number, the game mode is switched to the cashback mode. However, the present invention is not restricted to such an arrangement. In addition, the gaming machine according to the present invention may provide a function whereby, in a case that the balance of coins bet/coins paid out drops below a predetermined amount, the game mode is switched to the cashback mode.

A description has not been provided in the present embodiment regarding player identification information in particular. Furthermore, an arrangement may be made according to the present invention in which player identification information is provided for each player, and a predetermined variable (e.g., the number of games, the balance of credits) is counted and accumulated for each player in a form that is associated with the player identification information. With such an arrangement, at the time when the game is started, or at the time when the game mode is switched to the insurance mode, the gaming machine 10 requests the player to input the player's own identification information. Upon the player inputting the player identification information, the predetermined variable thus counted is reset. Such an arrangement ensures that cashback is awarded to a player who has spent a great amount of credits, thereby further enhancing the player's interest in the amusement service.

A description has been provided in the present embodiment regarding an arrangement in which the symbols are rearranged (see Step 16 in FIG. 9), and processing is performed according to the symbol combination thus rearranged (Step S17 in FIG. 9), followed by the number of games being counted (Step S18 in FIG. 9). However, according to the present invention, the timing at which the number of games is counted is not particularly restricted. For example, an arrangement may be made in which the number of games is counted at a predetermined timing (e.g., the timing at which the symbols are rearranged) in a period of time from the beginning of the display of the symbols up to the completion of processing executed based upon the symbol combination thus rearranged. It should be noted that the timing at which the balance of credits is calculated may be set to a predetermined timing in the same way as described above.

Furthermore, an arrangement may be made according to the present invention in which, in a case where the player has won a particular award before the game mode is switched to the cashback mode, and after the number of games has reached the predetermined number, the gaming machine 10 provides only the switching of the game mode to the cashback mode. Moreover, an arrangement may be made in which, in such a case, the gaming machine 10 selects one of the bonus game stage and the cashback mode, based upon the game state or the like, and the bonus game stage or the cashback mode is provided according to the selection results.

It should be noted that the function of providing the cashback mode according to the balance of credits may be modified in a form similar to that of the aforementioned arrangement. That is, an arrangement may be made in which, in a case where the player has won a particular award before the game mode is switched to the cashback mode and after the balance of credits has reached a predetermined amount or less, the gaming machine 10 provides only the bonus game stage, or provides only the cashback mode. In addition, an arrangement may be made in which, in such a case, the gaming machine 10 selects one between the bonus game stage and the cashback mode based upon the game state or the like, and the bonus game stage or the cashback mode is provided according to the selection.

Furthermore, an arrangement may be made in which, when the number of games thus counted reaches a predetermined number, a cashback mode is provided to the player, which offers an award in a form similar to a free game, a second game, mystery bonus, etc. With such an arrangement, a predetermined amount of credits are paid out by means of any one of these award forms.

Moreover, the timing at which a predetermined amount of credits are paid out is not restricted to the timing at which the symbols are rearranged after the completion of a unit game, similar to the aforementioned mystery bonus. For example, an arrangement may be made in which the credits are paid out immediately after the number of games has reached the predetermined number.

In addition, the payout method for paying out a predetermined amount of credits is not restricted in particular. For example, an arrangement may be made in which actual coins are to be paid out. Furthermore, an arrangement may be made in which the credit amount is to be added to.

However, let us consider an arrangement that allows the player to distinguish between whether the player receives the payout according to the normal game or the bonus game, or receives the payout according to the cashback mode. In order to provide such a function, such an arrangement needs to have the following function. That is, such an arrangement needs to provide a function whereby, in a case that actual coins are to be paid out according to the mystery bonus in the cashback mode, the coins are paid out at a timing that differs from that at which coins are paid out according to the normal game or according to the bonus game. In addition, an arrangement may be made in which payout according to the normal game or according to the bonus game is performed using actual coins, and payout according to the cashback mode is performed by adding to the credits, thereby allowing the player to discern the difference in the payout between the game in the normal game stage or in the bonus game stage and the game in the cashback mode.

While the embodiments according to the present invention have been described above, it should be clearly understood that the embodiments are in no way meant to restrict the present invention, and that the specific configurations such as the means may be modified and altered as suitable. Moreover, it should be understood that the advantages described in association with the embodiments are merely a listing of most preferred advantages, and that the advantages of the present invention are by no means restricted to those described in connection with the embodiments.

While preferred embodiments of the present invention have been described and illustrated above, it is to be understood that they are exemplary of the invention, and are not to be considered to be limiting. Additions, omissions, substitutions, and other modifications can be made thereto without departing from the spirit or scope of the present invention. Accordingly, the invention is not to be considered to be limited by the foregoing description, and is only limited by the scope of the appended claims.

What is claimed is:

1. A slot machine comprising:

a display that displays an image;

a symbol display device that is capable of displaying a plurality of symbols;

an input device that allows a player to input an instruction; and a controller programmed to execute the processes of:

(a) executing a game by, after a predetermined amount of credits, which is not more than a maximum bet amount determined beforehand, has been bet, rearranging the plurality of symbols via the symbol display device, and paying out a predetermined amount of credits according to the rearranged symbols;

(b) determining whether the amount of bet credits is the maximum bet amount;

(c) switching the game mode from a non-insurance mode to an insurance mode according to a player's input operation via said input device, when a predetermined amount of credits has been inserted;

(d) counting the number of games after the game mode has been switched to the insurance mode, in a case where determination has been made in the determining process (b) that the amount of bet credits matches the maximum bet amount, and in a case where the switched game mode is the insurance mode;

(e) executing a pay out of a predetermined amount of credits, when the number of games counted in the counting process (d) has reached a predetermined number; and (f) displaying the difference between the counted number of games and the predetermined number, only in a case where determination has been made in the determining process (b) that the amount of bet credits on the game matches the maximum bet amount.

2. A slot machine according to claim 1, wherein the controller is further programmed to execute the process (g): displaying an image indicating a mode selected from the insurance mode and the non-insurance mode on the display.

3. A slot machine according to claim 1, wherein, in the displaying process (f), after the difference between the predetermined number and the counted number of games has reached a predetermined number, the difference is displayed, and a rendered image is displayed every time the number of games is counted.

4. A slot machine according to claim 1, wherein the symbol display device is a mechanical reel device including a plurality of reels, each of which has an outer face bearing the plurality of symbols;

the display comprises a first display provided in front of the mechanical reel device, having a function of displaying a screen image while allowing a player to visually observe the plurality of symbols displayed on the plurality of reels, and a second display provided above the first display; and the first display displays the image that indicates the difference between the counted number of games and the predetermined number, and the second display displays an image indicating that the current game state is the insurance mode, in the displaying process (f).

5. A method for a slot machine comprising the steps of:

(a) executing a game by, after a predetermined amount of credits, which is not more than a maximum bet amount determined beforehand, has been bet, rearranging a plurality of symbols via a symbol display device that is capable of displaying the plurality of symbols, and paying out a predetermined amount of credits according to the rearranged symbols;

(b) determining whether the amount of bet credits is the maximum bet amount;

(c) switching the game mode from a non-insurance mode to an insurance mode according to a player's input operation via an input device that allows the player to input an instruction, when a predetermined amount of credits has been inserted;

(d) counting the number of games after the game mode has been switched to the insurance mode, in a case where determination has been made in the determining step (b) that the amount of bet credits matches the maximum bet amount, and in a case where the switched game mode is the insurance mode;

(e) executing a pay out of a predetermined amount of credits, when the number of games counted in the counting step (d) reaches a predetermined number; and (f) displaying the difference between the counted number of games and the predetermined number, only in a case where determination has been made in the determining step (b) that the amount of credits bet on the game matches the maximum bet amount.

* * * * *